United States Patent
Strobel et al.

(10) Patent No.: US 10,873,366 B2
(45) Date of Patent: Dec. 22, 2020

(54) VIRTUAL DISTRIBUTION POINT ARCHITECTURE

(71) Applicant: Intel Corporation, Santa Clara, CA (US)

(72) Inventors: Rainer Strobel, Munich (DE); Vladimir Oksman, Morganville, NJ (US)

(*) Notice: Subject to any disclaimer, the term of this patent is extended or adjusted under 35 U.S.C. 154(b) by 0 days.

(21) Appl. No.: 16/281,238

(22) Filed: Feb. 21, 2019

(65) Prior Publication Data

US 2019/0319668 A1    Oct. 17, 2019

Related U.S. Application Data

(60) Provisional application No. 62/658,278, filed on Apr. 16, 2018.

(51) Int. Cl.
| | |
|---|---|
| *H04B 3/32* | (2006.01) |
| *H04B 10/2507* | (2013.01) |
| *H04B 3/52* | (2006.01) |
| *H04B 10/25* | (2013.01) |

(52) U.S. Cl.
CPC ............ *H04B 3/32* (2013.01); *H04B 3/52* (2013.01); *H04B 10/2507* (2013.01); *H04B 10/2589* (2020.05)

(58) Field of Classification Search
None
See application file for complete search history.

(56) References Cited

U.S. PATENT DOCUMENTS

| | | | | |
|---|---|---|---|---|
| 8,396,369 | B1* | 3/2013 | Farmer ............ | H04B 10/25751 398/116 |
| 8,537,655 | B2* | 9/2013 | Nuzman ................ | H04B 3/32 370/201 |
| 8,544,051 | B1* | 9/2013 | Ramakrishnan ... | H04N 21/4383 725/111 |

(Continued)

FOREIGN PATENT DOCUMENTS

EP    2852067 A1    3/2015

OTHER PUBLICATIONS

Medhi, Von Neumann Architecture, 2012 (Year: 2012).*

(Continued)

*Primary Examiner* — Jai M Lee
(74) *Attorney, Agent, or Firm* — Maschoff Brennan

(57) ABSTRACT

A distribution point unit (DPU) circuit associated with a communication system configured to be coupled to a central office management (COM) circuit over fiber, is disclosed. The DPU circuit comprises one or more processors configured to provide one or more upstream data signals in digital domain or analog domain, to the COM circuit over fiber. In some embodiments, the one or more upstream data signals are associated with one or more modem circuits respectively coupled to one or more lines associated with the DPU circuit. In some embodiments, the one or more processors is further configured to receive one or more downstream data signals from the COM circuit over fiber, in digital domain or analog domain. In some embodiments, the one or more downstream data signals are to be provided to the one or more modem circuits respectively coupled to the one or more lines associated with the DPU circuit.

29 Claims, 14 Drawing Sheets

(56) References Cited

U.S. PATENT DOCUMENTS

| | | | | |
|---|---|---|---|---|
| 8,649,686 B1* | 2/2014 | Booth | | H04B 10/25 |
| | | | | 398/162 |
| 8,848,523 B2* | 9/2014 | Boyd | | H04Q 11/0067 |
| | | | | 370/229 |
| 8,977,126 B2* | 3/2015 | Boyd | | H04L 12/2801 |
| | | | | 398/66 |
| 9,071,358 B2* | 6/2015 | Pietsch | | H04L 12/6418 |
| 9,577,756 B2* | 2/2017 | Al-Banna | | H04B 10/07953 |
| 2003/0086362 A1* | 5/2003 | Hasegawa | | H04B 3/32 |
| | | | | 370/201 |
| 2008/0002718 A1* | 1/2008 | Bernard | | H04Q 11/0067 |
| | | | | 370/395.51 |
| 2010/0104287 A1* | 4/2010 | Biegert | | H04J 3/1694 |
| | | | | 398/67 |
| 2010/0202281 A1* | 8/2010 | Kramer | | H04L 25/0224 |
| | | | | 370/201 |
| 2011/0033189 A1* | 2/2011 | Biegert | | H04B 10/25754 |
| | | | | 398/115 |
| 2011/0096870 A1* | 4/2011 | Schenk | | H04B 3/32 |
| | | | | 375/296 |
| 2012/0051734 A1* | 3/2012 | Weiss | | H04B 10/0799 |
| | | | | 398/9 |
| 2012/0198510 A1* | 8/2012 | Stoneback | | H04B 10/25751 |
| | | | | 725/129 |
| 2012/0275792 A1* | 11/2012 | Nandiraju | | H04J 14/0257 |
| | | | | 398/66 |
| 2012/0281738 A1* | 11/2012 | Clausen | | H04L 25/0226 |
| | | | | 375/219 |
| 2013/0202293 A1* | 8/2013 | Boyd | | H04Q 11/0067 |
| | | | | 398/38 |
| 2013/0215935 A1* | 8/2013 | Nuzman | | H04M 3/18 |
| | | | | 375/219 |
| 2013/0302031 A1* | 11/2013 | Tanimura | | H04B 10/07 |
| | | | | 398/38 |
| 2014/0056312 A1* | 2/2014 | Strobel | | H04J 3/10 |
| | | | | 370/459 |
| 2014/0105604 A1* | 4/2014 | Luo | | H04J 3/10 |
| | | | | 398/98 |
| 2014/0119419 A1* | 5/2014 | Strobel | | H04L 25/00 |
| | | | | 375/224 |
| 2014/0362869 A1* | 12/2014 | Pan | | H04B 10/27 |
| | | | | 370/436 |
| 2015/0188653 A1* | 7/2015 | Hanks | | H04L 43/10 |
| | | | | 370/203 |
| 2015/0215059 A1* | 7/2015 | Kerpez | | H04M 11/062 |
| | | | | 379/406.01 |
| 2016/0204864 A1* | 7/2016 | Linney | | H04L 12/2858 |
| | | | | 398/72 |
| 2016/0204871 A1* | 7/2016 | Li | | H04B 10/5161 |
| | | | | 398/183 |
| 2016/0261556 A1* | 9/2016 | Zheng | | H04L 45/745 |
| 2016/0294441 A1* | 10/2016 | Fazlollahi | | H04B 3/36 |
| 2016/0365896 A1* | 12/2016 | Tu | | H04B 3/487 |
| 2017/0085719 A1* | 3/2017 | Linney | | H04L 41/0816 |
| 2017/0250732 A1* | 8/2017 | Bowler | | H04B 3/36 |
| 2017/0272311 A1* | 9/2017 | Kerpez | | H04L 41/0672 |
| 2019/0097682 A1* | 3/2019 | Berg | | H04B 3/466 |

OTHER PUBLICATIONS

Hewlett-Packard Journal, Cross Talk in Unshielded Twisted-Pair Cables, 1995, p. 19-20 (Year: 1995).*

Wikipedia, Data compression, 2016 (Year: 2016).*

European Search Report dated Jul. 19, 2019 in connection with European Patent Application 19162689.4.

"Cross Talk in Unshielded Twisted-Pair Cables." Hewlett-Packard Journal. Aug. 1995. 3 pages.

"TR-301 Architecture and Requirements for Fiber to the Distribution Point." Issue: 1. Issue Date: Aug. 2015. Broadband Forum Technical Report. 55 pages.

Mullins, Mark. "Cable Testing 101: Understanding Near and Far End Crosstalk." Sep. 15, 2019. https://www.flukenetworks.com/blog/cabling-chronicles/cable-testing-101-cross-talk-near-and-far. 2 pages.

"What is Cloud Networking or Cloud Based Networking?" sdx central. https://www.sdxcentral.com/cloud/definitions/all-about-cloud-networking/. 3 pages.

"What is cloud networking." What is Cloud Networking? How the Cloud is Changing Networking—Citrix. 1999-2019 Citrix Systems, Inc. https://www.citrix.com/glossary/cloud-networking.html. 3 pages.

"Series G: Transmission Systems and Media, Digital Systems and Networks Access networks—Metallic access networks Fast access to subscriber terminals (G.fast)—Physical layer specification." ITU-T Telecommunication Standardization Sector of ITU. G9701 (Dec. 2014). 324 pages.

Extended European Search Report dated Oct. 24, 2019 in connection with European Patent Application 19162689.4.

* cited by examiner

VIRTUAL DISTRIBUTION POINT ARCHITECTURE

REFERENCE TO RELATED APPLICATIONS

This application claims the benefit of provisional Application No. 62/658,278, filed Apr. 16, 2018, entitled "VIRTUAL DISTRIBUTION POINT ARCHITECTURE", contents of which are herein incorporated by reference in their entirety.

FIELD

The present disclosure relates to wireline networks, and in particular, to a system and method for virtualization of signal processing tasks associated with a distribution point unit (DPU) in wireline networks.

BACKGROUND

Modern wired access systems can bring a huge bandwidth to premises, such as multi-gigabit bit rates provided by MGFAST. To achieve higher data rates in the wireline/copper access networks, it is required to bring the fiber closer to the subscriber. For multi-Gigabit connections over copper wire, the maximum copper distance is in the range of 30-50 m and thus, it may be required to use multiple distribution point units to serve the subscribers in a building. Instead of distribution point units (DPUs), which serve multiple subscribers, fiber extenders (FEs) may be used, where each device serves only one single subscriber.

BRIEF DESCRIPTION OF THE DRAWINGS

Some examples of circuits, apparatuses and/or methods will be described in the following by way of example only. In this context, reference will be made to the accompanying Figures.

DETAILED DESCRIPTION

Figure 1:
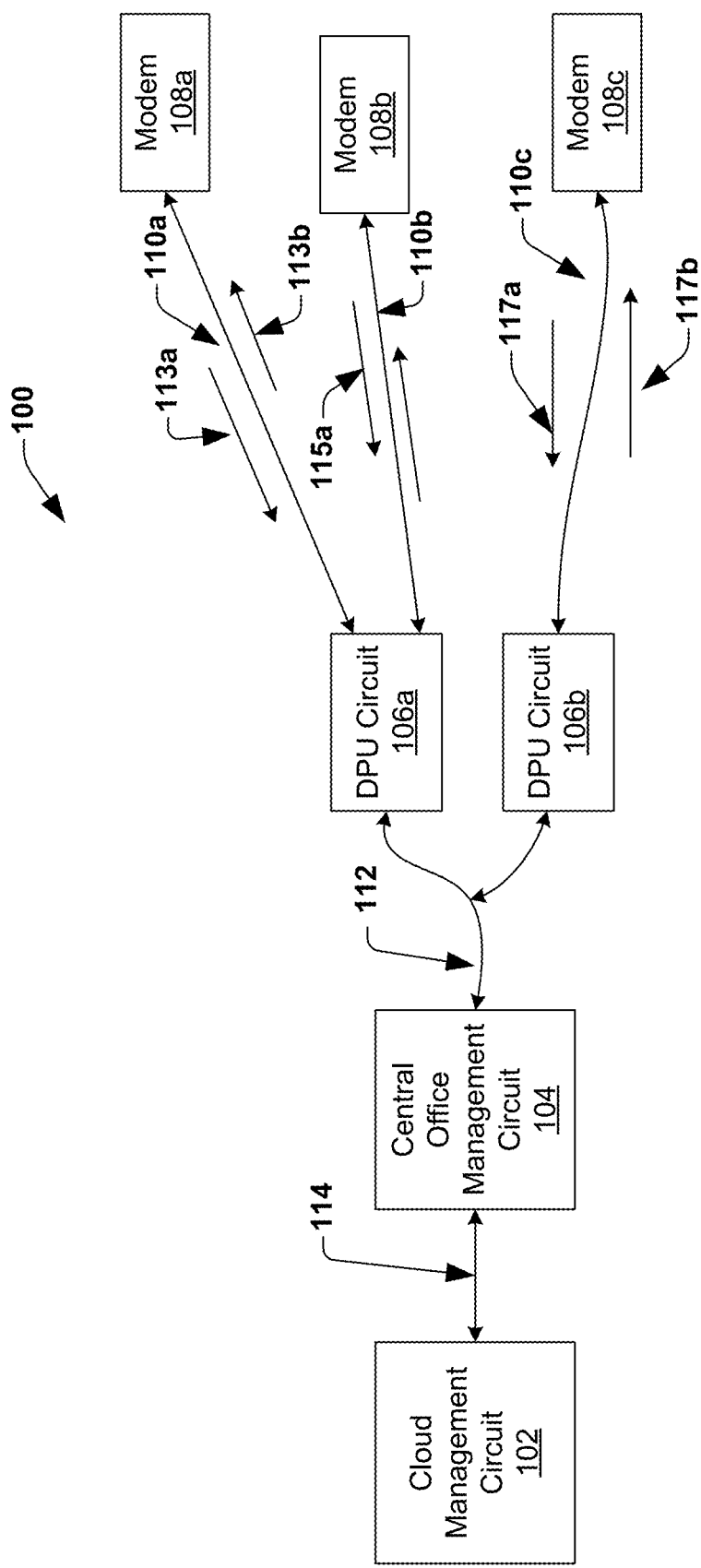
FIG. 1 illustrates a simplified block diagram of a wireline communication system, according to one embodiment of the disclosure.

In one embodiment of the disclosure, a central office management (COM) circuit associated with a communication system configured to couple to a set of distribution point unit (DPU) circuits over fiber is disclosed. In some embodiments the COM circuit comprises a memory configured to store a plurality of instructions; and one or more processors configured to retrieve the plurality of instructions from the memory. In some embodiments, the one or more processors, upon execution of the plurality of instructions, is configured to process one or more upstream data signals received from the set of DPU circuits over fiber. In some embodiments, the one or more upstream data signals are associated with one or more modem circuits coupled respectively to one or more lines associated with the set of DPU circuits. In some embodiments, each of upstream data signals is received from a respective DPU circuit in digital domain or analog domain. In some embodiments, the one or more processors is further configured to process one or more downstream data signals to be provided to the set of DPU circuits over fiber. In some embodiments, the one or more downstream data signals are associated with the one or more modem circuits coupled respectively to the one or more lines associated with the set of DPU circuits. In some embodiments, each of the downstream data signals is provided to a respective DPU circuit in digital domain or analog domain. In some embodiments, the one or more downstream data signals and the one or more upstream data signals are processed, in order to enable to perform one or more signal processing operations associated with the one or more downstream data signals and the one or more upstream data signals.

In one embodiment of the disclosure, a distribution point unit (DPU) circuit associated with a communication system configured to be coupled to a central office management (COM) circuit over fiber is disclosed. In some embodiments, the DPU circuit comprises a memory configured to store a plurality of instructions; and one or more processors configured to retrieve the plurality of instructions from the memory. In some embodiments, the one or more processors, upon execution of the plurality of instructions, is configured to provide one or more upstream data signals in digital domain or analog domain, to the COM circuit over fiber, in order to enable the COM circuit to perform one or more signal processing operations on the upstream data signals. In some embodiments, the one or more upstream data signals are associated with one or more modem circuits respectively coupled to one or more lines associated with the DPU circuit.

In one embodiment of the disclosure, cloud management (CM) circuit associated with a communication system configured to couple to a COM circuit over fiber is disclosed. In some embodiments, the COM circuit comprises a memory configured to store a plurality of instructions; and one or more processors configured to retrieve the plurality of instructions from the memory. In some embodiments, the one or more processors, upon execution of the plurality of instructions, is configured to receive one or more upstream data signals from the COM circuit in analog domain or in digital domain. In some embodiments, the one or more upstream data signals are associated with one or more modem circuits coupled respectively to one or more lines associated with a set of DPU circuits coupled to the COM circuit. In some embodiments, the one or more processors is further configured to perform one or more of the signal processing operations comprising analog to digital (A/D) conversion, TD filtering, fast Fourier transform (FFT), frequency domain (FD) equalization, quadrature amplitude modulation (QAM) demodulation, constellation shaping, inner forward error correction (FEC) decoding, outer FEC decoding and data encapsulation, on the received one or more upstream data signals.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," "circuit" and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from conte8, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from conte8 to be directed to a singular form. Furthermore, to the event that the terms "including", "includes", "having", "has", "with", or variants thereof are used in either the detailed description and the claims, such terms are intended to be inclusive in a manner similar to the term "comprising."

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

As indicated above, for multi-gigabit connections over copper wire, the maximum copper distance is in the range of 30-50 m and thus, it may be required to use multiple distribution point units to serve the subscribers in a building. Legacy wireline systems cannot cope with new network architectures required in certain G.fast and MGfast deployment scenarios because, due to short distances of service, very high density of distribution point unit (DPU) deployment is required. Legacy systems perform all signal processing inside the DPU. In the embodiments described throughout the disclosure, the term DPU or DPU circuit includes both DPUs and fiber extenders (FEs), and is not to be construed to be limited to DPUs. Performing all the signal processing tasks within the DPU, however, has the following issues:

DPUs are complex and consume high power—the deployment becomes not vital economically There are no good technical solutions currently to cancel crosstalk between DPUs because of lack of direct connection between them and also because of latency in case if multiple DPUs are connected via the network.

In order to overcome the above disadvantages, a system and a method for virtualization of signal processing tasks associated with a distribution point unit (DPU) in wireline networks is proposed in this disclosure. In particular, a wireline communication system where the signal processing tasks associated with the DPU are split between the DPUs/FEs, and at least one of a central office management (CO) circuit and a cloud management (CM) circuit is proposed. In some embodiments, virtualization allows performing majority of heavy processing at a central office location or in the cloud, or shared between both, which substantially simplifies DPUs, reduces their power consumption, and can easily coordinate/synchronize transmit and receive signals. Further, in some embodiments, virtualization enables to perform crosstalk cancellation between the different DPUs at the central office or the cloud.

FIG. 1 illustrates a simplified block diagram of a wireline communication system 100, according to one embodiment of the disclosure. The wireline communication system 100 comprises a cloud management circuit 102, a central office management (COM) circuit 104 and two distribution point unit (DPU) circuits 106a and 106b. In some embodiments, the DPU circuit 106a (also the DPU circuit 106b) comprises an equipment comprising a plurality of components configured to communicate to one or more modems or transceivers over copper wire (e.g., 108a, 108b and 108c). In some embodiments, each of the DPU circuits 106a and 106b is configured to couple to the modems over copper wires. In some embodiments, DPU circuits may be configured to couple to one or more modems (e.g., the DPU circuit 106a). However, in other embodiments, the DPU circuits may be configured to be coupled to a single modem circuit (e.g., the DPU circuit 106b). In the embodiments described herein, the modem circuits (e.g., 108a. 108b and 108b) refer to any transceiver or communication device that is configured to communicate with the DPU circuit and is not to be construed as limited to a cable modem. In some embodiments, the modems 108a, 108b and 108c comprises equipments that are located in a user location (e.g., customer premises equipment or CPE).

In some embodiments, each of the DPU circuits 106a and 106b is further configured to couple to a central office management circuit 104. In some embodiments, each of the DPU circuits 106a and 106b is configured to couple to the central office management (COM) circuit 104 over the fiber link 112. In some embodiments, the DPU circuit 106 comprises a communication node located at a location closer to customer premises and enables to provide a transition between fiber networks and copper networks. In some embodiments, the COM circuit 104 comprises an equipment comprising a plurality of components located at a central location of a communication system and is configured to communicate with one or more DPUs (e.g., the DPU circuits 106a and 106b). However, in other embodiments, the COM circuit 104 may be located at a location different from the central location, for example, a communication node or at the cloud. In some embodiments, the COM circuit 104 is further configured to communicate with a cloud management (CM) circuit 102 (for example, in embodiments where the COM circuit is located at a location different from the cloud). In some embodiments, the COM circuit 104 is configured to coupe to the CM circuit 102 over the fiber link 114. In some embodiments, the CM circuit 102 comprises an equipment comprising a plurality of components located at a head-end location (e.g., the cloud) of a communication system and is configured to couple with COM circuits (e.g., the COM circuit 104), in order to communicate with the DPUs. In this embodiment, the wireline communication system 100 is shown to be coupled to only one COM circuit (i.e., the COM circuit 104). However, in other embodiments, the CM circuit 102 may be configured to be coupled to more than one COM circuit and each of the COM circuits may be configured to be coupled to one or more DPU circuits.

In some embodiments, the wireline communication system 100 enables to perform virtualization of the DPU signal processing tasks. In other words, in some embodiments, the wireline communication system 100 enables to split the signal processing tasks associated with the wireline communication system 100 between the DPU circuit (e.g., the DPU circuit 106a), the COM circuit 104 and the CM circuit. In some embodiments, the task split between cloud (i.e., the CM circuit 102), CO (i.e., the COM circuit 104) and DPU/FE (i.e., the DPU circuit 106a) is selected, depending on the computation requirements associated with these tasks as well as the timing and delay and bandwidth requirements. A possible implementation of the tasks split between the cloud, the CO and the DPU/FE is illustrated in Table 1 below. However, in different embodiments, the signal processing tasks may be split between the cloud, the CO and the DPU/FE may be split differently.

TABLE 1

Signal processing tasks for wireline channel

| Processing task | Input/output | Location |
| --- | --- | --- |
| AD (RX) and DA (TX) conversion | Analog signal <-> digital samples | FE/DPU (required) |
| Time domain filtering | Samples (analog clock) <-> samples (band limited, lower sample rate) | FE/DPU |
| FFT (rx) and IFFT (tx) | TD samples <-> FD samples | FE/DPU or CO |
| FD equalization | FD samples | FE/DPU or CO |
| Echo cancellation | FD samples | FE/DPU or CO |
| NEXT cancellation | FD samples | CO or Cloud |
| FEXT precoding (ds) and FEXT equalization (us) | FD samples | CO or Cloud |
| QAM demodulation | FD samples <-> LLR (rx) and hard decision bits (tx and rx) | CO or Cloud |
| Inner FEC decoding | LLR values (rx) <-> Hard decision bits | CO or cloud |
| Constellation shaping | Bits | CO or cloud |
| Outer FEC decoding | Bits <-> Layer 1 data frames | CO or cloud |
| Data processing: encapsulation/decapsulation, retransmission; multiplexing | Layer 1 data frames <-> Layer 2 user data packets | CO or cloud |

Referring back to FIG. 1, in some embodiments, the DPU circuit 106a is configured to receive a first upstream data signal 113a associated with the modem circuit 108a over the copper line 110a. Further, the DPU circuit 106a is configured to receive a second upstream data signal 115a associated with the modem circuit 108b over the copper line 110b. Upon receiving the upstream data signals 113a and 115a, in some embodiments, the DPU circuit 106a is further configured to provide the first upstream data signal 113a and the second upstream data signal 115a, in digital domain or analog domain to the COM circuit 104 over the fiber link 112. In the embodiments described throughout the disclosure, the term digital domain refers to digital signals comprising time domain samples or frequency domain samples. Similarly, in the embodiments described throughout the disclosure, the term analog domain refers to analog signals. The digital signals and the analog signals described throughout the disclosure are different from data packets (e.g., ethernet packets). In some embodiments, the DPU circuit 106a is configured to receive the first upstream data signal 113a and the second upstream data signal 115a in analog domain (e.g., as analog signals) from the respective modem circuits. In some embodiments, the DPU circuit 106a is further configured to perform one or more of the signal processing operations comprising optical modulation, analog to digital conversion (A/D conversion), time domain (TD) filtering, fast Fourier transform (FFT), frequency domain (FD) equalization, on the first upstream data signal 113a and the second upstream data signal 115a, prior to providing the first upstream data signal 113a and the second upstream data signal 115a to the COM circuit 104.

In some embodiments, optical modulation comprises modulating the upstream data signal in analog domain on a particular fiber wavelength, the A/D conversion comprises converting the analog signal into digital TD samples and TD filtering comprises generating bandlimited lower sample rate TD samples. Further, in some embodiments, FFT operation comprises converting the TD samples to FD samples and FD equalization comprises quantizing the FD samples. In one example embodiment, if the DPU circuit 106a is configured to provide the first upstream data signal 113a in digital domain (e.g., as time domain (TD) samples) over the fiber link 112, the DPU circuit 106a may be configured to perform analog to digital conversion and time domain (TD) filtering of the first upstream data signal 113a (thereby generating TD samples), prior to providing the first upstream data signal 113a to the COM circuit 104. Further, in some embodiments, if the DPU circuit 106a is configured to provide the first upstream data signal 113a in digital domain (e.g., as frequency domain (FD) samples) over the fiber link 112, the DPU circuit 106a may be configured to perform analog to digital conversion, time domain (TD) filtering, fast Fourier transform (FFT) and frequency domain (FD) equalization of the first upstream data signal 113a (thereby generating FD samples), prior to providing the first upstream data signal 113a to the COM circuit 104.

In some embodiments, the DPU circuit 106a is further configured to provide a first downstream data signal 113b to the modem circuit 108a over the copper line 110a and provide a second downstream data signal 115b to the modem circuit 108b over the copper line 110b. In some embodiments, the DPU circuit 106a is configured to provide the first downstream data signal 113b and the second downstream data signal 115b to the respective modem circuits in analog domain (e.g., as analog signals). In some embodiments, the DPU circuit 106a is configured to receive the first downstream data signal 113b and the second downstream data signal 115b, in digital domain or analog domain, from the COM circuit 104. Upon receiving the first downstream data signal 113b and the second downstream data signal 115b from the COM circuit 104, in some embodiments, the DPU circuit 106a is configured to perform one or more of the signal processing operations comprising frequency domain (FD) equalization, inverse fast Fourier transform (IFFT), time domain (TD) filtering, digital to analog (D/A) conversion and optical demodulation, on the first downstream data signal 113b and the second downstream data signal 115b, prior to providing the first downstream data signal 113b and the second downstream data signal 115b to the respective modem circuits.

In particular, in some embodiments, if the DPU circuit 106a is configured to receive the first downstream data signal 113b in digital domain (e.g., as TD samples) over the fiber link 112, the DPU circuit 106a may be configured to perform TD filtering and D/A conversion on the first downstream data signal 113b (thereby generating an analog signal), prior to providing the first downstream data signal to the modem circuit 108a. Similarly, in some embodiments, if the DPU circuit 106a is configured to receive the first downstream data signal 113b in digital domain (e.g., as FD samples) over the fiber link 112, the DPU circuit 106a may be configured to perform IFFT, TD filtering and D/A conversion on the first downstream data signal 113b (thereby generating an analog signal), prior to providing the first downstream data signal to the modem circuit 108a. In some embodiments, the IFFT operation comprises converting the FD samples to TD samples. Further, in some embodiments, if the DPU circuit 106a is configured to receive the first downstream data signal 113b in analog domain over the fiber link 112, the DPU circuit 106a may be configured to perform optical demodulation, prior to providing the first downstream data signal to the modem circuit 108a.

In some embodiments, a downstream data signal interferes with an upstream data signal associated with the same line, causing echo. For example, in one example embodiment, the first downstream data signal 113b may interfere with the first upstream data signal 113a on the same copper line 110a, thereby causing an echo in the first upstream data signal 113a, which needs to be cancelled. In such embodiments, the DPU circuit 106a may be configured to perform echo cancellation based on the first upstream data signal 113a and the first downstream data signal 113b. Further, the DPU circuit 106a may be configured to perform echo cancellation on each line associated with the DPU circuit 106a. Further, in some embodiments, a downstream data signal associated with one line of the DPU circuit 106a may interfere with the upstream data signal of another line associated with the DPU circuit 106a causing near end crosstalk (NEXT) and far end crosstalk (FEXT). For example, in one example embodiment, the first downstream data signal 113b may interfere with the second upstream data signal 115a on the copper line 110b, thereby causing NEXT and FEXT. In such embodiments, the DPU circuit 106a may be further configured to perform FEXT and NEXT cancellation based on the second upstream data signal 115a and the first downstream data signal 113b.

Similarly, in other embodiments, the second downstream data signal 115b may interfere with the first upstream data signal 113a on the copper line 110a, thereby causing near end crosstalk (NEXT) and far end crosstalk (FEXT). In such embodiments, the DPU circuit 106a may be further configured to perform NEXT and FEXT cancellation based on the second upstream data signal 115a and the first downstream data signal 113b. In some embodiments, DPU circuit 106a is configured to perform the crosstalk cancellation (i.e., the NEXT/FEXT/echo) in time domain or in frequency domain. In some embodiments, in order to enable FEXT/NEXT cancellation, the DPU circuits associated with the wireline communication system 100, for example, the DPU circuit 106a may be configured to establish a timing reference within the DPU circuit, which in turn enables to adjust a timing associated with both the upstream data signals and the downstream data signals associated with the DPU circuit. In some embodiments, the timing reference within the DPU circuits enables to establish a timing alignment between different DPU circuits that may have mutual crosstalk. In some embodiments, this precise timing reference is maintained during steady state operation (showtime) of these DPUs/FEs, which may require corrections/tuning of the timing also during showtime.

In some embodiments, the DPU circuit 106b is configured to receive a third upstream data signal 117a associated with the modem circuit 108c over the copper line 110c. Upon receiving the upstream data signal 117a, in some embodiments, the DPU circuit 106b is further configured to provide the third upstream data signal 117a, in digital domain or analog domain to the COM circuit 104 over the fiber link 112. In some embodiments, the DPU circuit 106b is configured to receive the third upstream data signal 117a in analog domain (e.g., as analog signals) from the modem circuit 108c. In some embodiments, the DPU circuit 106b is further configured to perform one or more of the signal processing operations comprising analog to digital conversion, time domain (TD) filtering, fast Fourier transform (FFT), frequency domain (FD) equalization and optical modulation, based on the third upstream data signal 117a, prior to providing the third upstream data signal 117a to the COM circuit 104.

In some embodiments, the DPU circuit 106b is further configured to provide a third downstream data signal 117b to the modem circuit 108c over the copper line 110c. In some embodiments, the DPU circuit 106b is configured to provide the third downstream data signal 117b to the modem circuit 108c in analog domain (e.g., as analog signal). In some embodiments, the DPU circuit 106b is configured to receive the third downstream data signal 117b in digital domain or analog domain, from the COM circuit 104. Upon receiving the third downstream data signal 117b, in some embodiments, the DPU circuit 106b is further configured to perform one or more of the signal processing operations comprising frequency domain (FD) equalization, inverse fast fourier transform (IFFT), time domain (TD) filtering, digital to analog (D/A) conversion and optical demodulation, on the third downstream data signal 117b, prior to providing the third downstream data signal 117b to the modem circuit 108c. In some embodiments, the DPU circuit 106b is further configured to perform echo cancellation associated with the copper line 110c. In some embodiments, although not mentioned explicitly, all DPU circuits (e.g., the DPU circuit 106a and the DPU circuit 106b) associated with the wireline communication system 100 share the same features.

In some embodiments, the COM circuit 104 is configured to receive the first upstream data signal 113a and the second upstream data signal 115a from the DPU circuit 106a, in digital domain or analog domain. In some embodiments, the COM circuit is further configured to receive the third upstream data signal 117a from the DPU circuit 106b, in digital domain or analog domain. In some embodiments, upon receiving the upstream data signals from the DPU circuits, the COM circuit 104 is further configured to perform one or more of the signal processing operations comprising analog to digital (A/D) conversion, time domain (TD) filtering, fast Fourier transform (FFT), frequency domain (FD) equalization, quadrature amplitude modulation (QAM) demodulation, constellation shaping, inner forward error correction (FEC) decoding, outer FEC decoding and data encapsulation, on the received upstream data signals. In some embodiments, the COM circuit 104 is further configured to provide the received upstream signals to the CM circuits, after performing the one or more of the signal processing tasks above. However, in other embodiments, the COM circuit 104 may be configured process the upstream data signals and convey the received upstream data signals to the CM circuit 102, without performing any signal processing tasks.

In some embodiments, the COM circuit 104 is further configured to provide the first downstream data signal 113b and the second downstream data signal 115b to the DPU circuit 106a over the fiber link 112. In some embodiments, the COM circuit 104 is further configured to provide the third downstream data signal 117b to the DPU circuit 106b over the fiber link 112. In some embodiments, the COM circuit 104 is configured to provide the downstream data signals to the respective DPU circuits in analog domain or digital domain. In some embodiments, the COM circuit 104 is configured to receive the downstream data signals from the cloud management (CM) circuit 102. In some embodiments, the COM circuit 104 is configured to receive the downstream data signals from the cloud management (CM) circuit 102 in digital domain or analog domain or as data packets. In some embodiments, the COM circuit 104 is further configured to perform one or more of the signal processing operations comprising data de-capsulation, inner forward error correction (FEC) encoding, outer FEC encoding, constellation shaping, quadrature amplitude modulation (QAM) modulation, crosstalk cancellation, frequency domain (FD) equalization, inverse fast Fourier transform (IFFT), time domain (TD) filtering, digital to analog (D/A) conversion, on the downstream data signals, in order to provide the downstream data signals to the respective DPU circuits in analog domain or digital domain.

In some embodiments, the COM circuit 104 is further configured to perform crosstalk (NEXT/FEXT/echo) cancellation between different DPU circuits or among different lines associated with a select DPU circuit, based on processing the upstream data signals and the downstream data signals. In some embodiments, the COM circuit 104 is configured to perform the crosstalk cancellation in digital domain (e.g., using TD samples or FD samples). For example, in the upstream direction, if the COM circuit 104 receives the upstream data signals in analog domain, the COM circuit 104 may be configured to perform A/D conversion and TD filtering, in order to perform cross talk cancellation using TD samples. In some embodiments, the COM circuit 104 may be further configured to perform FFT on the TD samples to generate FD samples and FD equalization, in order to perform crosstalk cancellation in FD domain. However, in some embodiments, if the COM circuit 104 receives upstream data signals as FD samples, the COM circuit 104 can perform crosstalk cancellation without any further signal processing. In some embodiments, the COM circuit 104 may be further configured to provide the FD samples to the CM circuit 102 for further processing. However, in some embodiments, the COM circuit 104 may be further configured to perform one or more of the signal processing operations on the FD samples comprising quadrature amplitude modulation (QAM) demodulation, constellation shaping, inner forward error correction (FEC) decoding, outer FEC decoding and data encapsulation, in order to generate layer 2 data packets. Upon generating the layer 2 data packets, the COM circuit 104 is further configured to provide the layer 2 data packets to the CM circuit 102.

Similarly, in the downstream direction, if the COM circuit 104 receives the downstream data signals as layer 2 data packets from the CM circuit 102, the COM circuit 104 may be configured to perform data de-capsulation, outer FEC encoding, constellation shaping, inner forward error correction (FEC) encoding, quadrature amplitude modulation (QAM) modulation and frequency domain (FD) equalization, in order to perform cross talk cancellation using FD samples. In some embodiments, the COM circuit 104 may be further configured to perform IFFT on the FD samples to generate TD samples and TD filtering, in order to perform crosstalk cancellation in TD domain. However, in some embodiments, if the COM circuit 104 receives the downstream data signals as FD samples from the CM circuit 102, the COM circuit 104 may be configured to perform crosstalk cancellation directly, without performing any further signal processing operations. In some embodiments, the COM circuit 104 may be configured provide the FD samples directly to the respective DPU circuits over the fiber link 112. However, in other embodiments, the COM circuit 104 may be further configured to perform one or more signal processing tasks comprising IFFT, TD filtering and D/A conversion on the FD samples, in order to provide the downstream data signals to the respective DPU circuits as TD samples or in analog domain.

In some embodiments, the CM circuit 102 is configured to receive the first upstream data signal 113a and the second upstream data signal 115a from the COM circuit 104 over the fiber link 114. In some embodiments, the CM circuit 102 is further configured to receive the third upstream data signal 117a from the COM circuit 104. In some embodiments, the CM circuit 102 is configured to receive the upstream data signals as layer 2 data packets from the COM circuit 104. However, in other embodiments, the CM circuit 102 is configured to receive the upstream data signals in digital domain or in analog domain. In some embodiments, the CM circuit 102 is further configured to perform one or more of the signal processing operations comprising analog to digital (A/D) conversion, time domain (TD) filtering, fast Fourier transform (FFT), frequency domain (FD) equalization, quadrature amplitude modulation (QAM) demodulation, constellation shaping, inner forward error correction (FEC) decoding, outer FEC decoding and data encapsulation, on the received upstream data signals, when the upstream data signals are received in analog domain or digital domain.

In some embodiments, the CM circuit 102 is further configured to provide the first downstream data signal 113b and the second downstream data signal 115b to the COM circuit 104 over the fiber link 114. In some embodiments, the CM circuit 102 is further configured to provide the third downstream data signal 117b to the COM circuit 104 over the fiber link 114. In some embodiments, the CM circuit 102 may be configured to provide the downstream data signals to the COM circuit 104 as layer 2 data packets. However, in other embodiments, the CM circuit 102 may be configured to provide the downstream data signals to the COM circuit 104 in analog domain or digital domain. In some embodiments, the CM circuit 102 is further configured to perform one or more of the signal processing operations comprising data de-capsulation, inner forward error correction (FEC) encoding, outer FEC encoding, constellation shaping, quadrature amplitude modulation (QAM) modulation, frequency domain (FD) equalization, inverse fast Fourier transform (IFFT), time domain (TD) filtering, digital to analog (D/A) conversion, on the downstream data signals, in order to provide the downstream data signals to the COM circuit 104 in digital domain or analog domain.

In the embodiments where the crosstalk cancellation is not performed at the COM circuit 104, the CM circuit 102 is further configured to perform crosstalk (NEXT/FEXT/echo) cancellation between different DPU circuits or among different lines associated with a select DPU circuit, based on processing the upstream data signals and the downstream data signals. In some embodiments, the CM circuit 102 is configured to perform the crosstalk cancellation in digital domain (e.g., using TD samples or FD samples). Therefore, in such embodiments, the CM circuit 102 may be configured to receive the upstream data signals from the COM circuit 104 in analog domain or digital domain, and not as layer 2 data packets. In one example embodiment, in the upstream direction, if the CM circuit 104 receives the upstream data signals in analog domain, the CM circuit 102 may be configured to perform A/D conversion and TD filtering, in order to perform cross talk cancellation using TD samples. In some embodiments, the CM circuit 102 may be further configured to perform FFT on the TD samples to generate FD samples and also perform FD equalization, in order to perform crosstalk cancellation in FD domain. However, in some embodiments, if the CM circuit 102 receives upstream data signals as FD samples, the CM circuit 102 can perform crosstalk cancellation without any further signal processing. In some embodiments, the CM circuit 102 may be further configured to perform one or more of the signal processing operations on the FD samples comprising quadrature amplitude modulation (QAM) demodulation, constellation shaping, inner forward error correction (FEC) decoding, outer FEC decoding and data encapsulation, in order to generate layer 2 data packets.

Similarly, in the downstream direction, in order to perform crosstalk cancellation, in some embodiments, the COM circuit 104 may be configured to perform data de-capsulation, outer FEC encoding, constellation shaping, inner forward error correction (FEC) encoding, quadrature amplitude modulation (QAM) modulation and frequency domain (FD) equalization, in order to perform cross talk cancellation using FD samples. In some embodiments, the CM circuit 102 may be further configured to perform IFFT on the FD samples to generate TD samples and also perform TD filtering, in order to perform crosstalk cancellation in TD domain. In some embodiments, the CM circuit 102 may be configured provide the FD samples directly to the COM circuit 104 over the fiber link 114. However, in other embodiments, the CM circuit 102 may be further configured to perform one or more signal processing tasks comprising IFFT, TD filtering and D/A conversion on the FD samples, in order to provide the downstream data signals as TD samples or in analog domain to the COM circuit 104.

In some embodiments, the crosstalk cancellation within the DPU circuits 106a and 106b, the COM circuit 104 and the CM circuit 102 is established based on using predefined cancellation matrices. In particular, in one embodiment, the predefined cancellation matrices comprise a precoder matrix $P^{(k)}$ of size L×L configured to precompensate/precode the downstream data signal, in order to cancel the downstream FEXT. In some embodiments, the predefined cancellation matrices further comprise an Equalizer matrix $G^{(k)}$ of size L×L to cancel upstream FEXT in the upstream data signal. Furthermore, the predefined cancellation matrices comprise a NEXT canceler matrix $G_{ec}^{(k)}$ of size L×L configured to cancel the NEXT/echo caused by the downstream data signal. Assuming a multicarrier signal with carriers k=1, . . . , K and line l=1, . . . , L, the downstream data signal, in some embodiments, is described by a vector $u_{ds}^{(k)} = [u_{ds,1}^{(k)}, \ldots, u_{ds,L}^{(k)}]^T$ for L lines and carrier k and the upstream data signal, in some embodiments, is described by the vector $u_{us}^{(k)} = [u_{us,1}^{(k)}, \ldots, u_{us,L}^{(k)}]^T$. In order to perform crosstalk cancellation, the following operations needs to be performed. In particular, for each carrier k, the downstream data signal $u_{ds}^{(k)}$ is multiplied by the precoder matrix $P^{(k)}$ to form the precompensated/precoded downstream signal $x_{ds}^{(k)}$ as given below:

$$x_{ds}^{(k)} = P^{(k)} u_{ds}^{(k)} \quad (1)$$

In some embodiments, the equation (1) is defined as a predefined far end crosstalk (FEXT) cancellation relation. In some embodiments, generating the precompensated/precoded downstream signal $x_{ds}^{(k)}$ enables to reduce the downstream FEXT.

Further, in some embodiments, the FEXT in the upstream data signal and the NEXT/Echo is cancelled as given below:

$$\hat{u}_{us}^{(k)} = G^{(k)} y_{us}^{(k)} + G_{ec}^{(k)} u_{ds}^{(k)} \quad (2)$$

In some embodiments, the equation (2) is defined as a predefined near end crosstalk (NEXT) cancellation relation. In some embodiments, $y_{us}^{(k)}$ comprises the upstream data signal prior to NEXT/FEXT cancellation, $\hat{u}_{us}^{(k)}$ is the upstream data signal after NEXT/FEXT cancellation and $u_{ds}^{(k)}$ is the downstream data signal (not precoded). Each of these operations requires $L^2 K$ multiply-accumulate operations per symbol. In cases where it is known that crosstalk between certain lines is zero, the corresponding operation can be skipped.

In some embodiments, the CM circuit 102, the COM circuit 104 and the DPU circuits may be configured to update the cancellation matrices $P^{(k)}$, $G^{(k)}$ and $G_{ec}^{(k)}$ to be utilized to perform the crosstalk cancellation. However, in other embodiments, the cancellation matrices $P^{(k)}$, $G^{(k)}$ and $G_{ec}^{(k)}$ may be updated at the cloud (i.e., the CM circuit 102) and the resulting matrices are transmitted back to the COM circuit 104 or the DPU circuits. In some embodiments, the update of the canceller matrices $P^{(k)}$, $G^{(k)}$ and $G_{ec}^{(k)}$ are performed at a much lower rate than the crosstalk cancellation operation itself. For the update operation, dedicated training symbols, e.g., sync symbols are transmitted once per superframe for each direction (i.e., as part of the upstream data signal and the downstream data signal), while each superframe consists of hundreds of symbols (e.g., 288 symbols). In one example embodiment, keeping the example of K=8000 carriers and L=8 lines with an update rate of $t_s$=6 ms gives the data rate for the training signals to be 24 bit×8000×8/6 ms=256 Mbit/s for each signal (512 Mbit/s for upstream and downstream). Performing one matrix update per L superframes requires another 6.1 Mbyte/(8×6 ms) gives roughly 1 Gbit/s for the coefficient update. A local coefficient update at the COM circuit or the DPU circuits has the advantage of reduced bandwidth on the data connection (i.e., the fiber link 114) to the cloud (1 Gbit/s+512 Mbit/s) while the coefficient update in the cloud (i.e., the CM circuit 102) comes with the advantage of more flexibility to perform changes of the coefficient update algorithms. Therefore, in the embodiments described herein, both methods may be supported and it is possible to switch between CO-based coefficient update and cloud-based coefficient update, depending on the update algorithm to be used. Different algorithms may be used for initial line training and for showtime updates.

The bandwidth of the fiber link 112 between the COM circuit 104 and the DPU circuits 106a and 106b is a critical resource, because high bandwidth fiber links require expensive components and such components have a high power consumption. In order to reduce the fiber bandwidth requirements, in some embodiments, the DPU circuits 106a and 106b are configured to compress the upstream data signals, prior to providing the respective upstream data signals to the COM circuit 104 over the fiber link 112. Similarly, in some embodiments, the COM circuit 104 is also configured to compress the downstream data signals, prior to providing the downstream data signals to the DPU circuits 106a and 106b over the fiber link 112. Further, in some embodiments, the COM circuit 102 may also be configured to compress the upstream data signals, prior to providing the upstream data signals to the CM circuit 102 over the fiber link 114. Furthermore, in some embodiments, the CM circuit 102 may also be configured to compress the downstream data signals, prior to providing the downstream data signals to the COM circuit 104 over the fiber link 114.

Figure 2C:
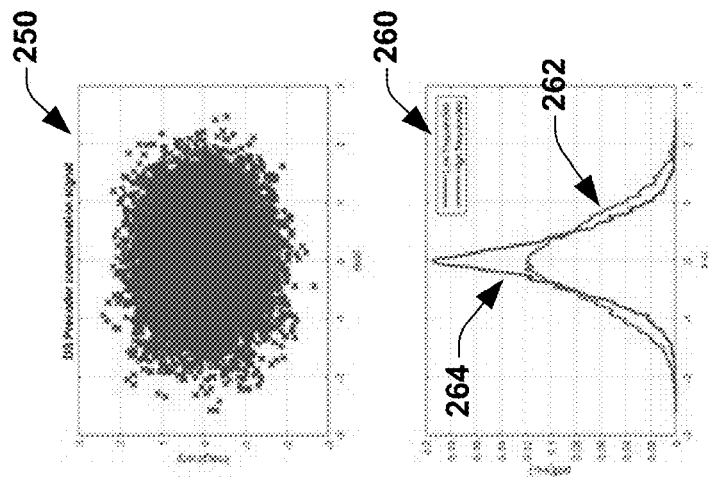
FIGS. 2a, 2b and 2c depicts the steps for compressing a signal based on signal decomposition method, according to one embodiment of the disclosure.
Figure 2B:
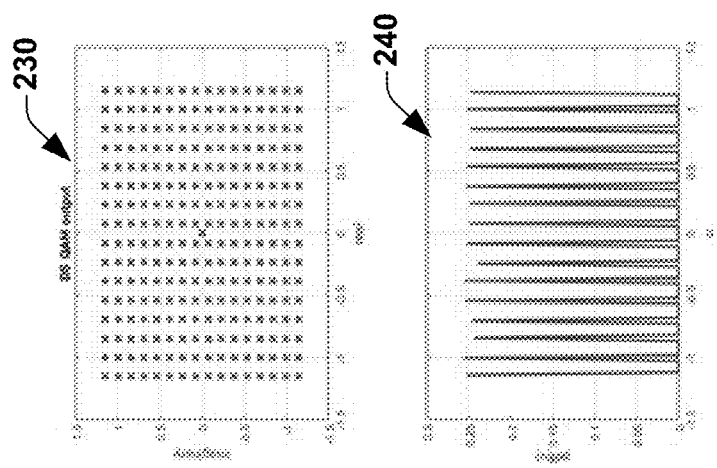

In some embodiments, the signals (e.g., the downstream data signals or the upstream data signals) may be compressed based on a signal decomposition method. In some embodiments, the signal decomposition comprises decomposing the signal into two components where one of the components can be described with the QAM modulator function. In one example embodiment, the COM circuit 104 may be configured to compress the precoded downstream signal $x_{ds}^{(k)}$, prior to providing the precoded downstream signal $x_{ds}^{(k)}$ over the fiber link 112. However, in other embodiments, the signal decomposition method is applicable to any downstream data signal or upstream data signal. In some embodiments, in order to compress the precoded downstream signal $x_{ds}^{(k)}$, the COM circuit 104 is configured to decompose the DS precoded output into a set of 256-QAM constellation points (as shown in 230 in FIG. 2b) and a random DS precoder compensation signal (as shown in 250 in FIG. 2c). The precoder output signal $x_{ds}^{(k)}$ consists of two signal components, the per-line QAM modulated signal $u_{ds}^{(k)}$ (as shown in 240 in FIG. 2b) as well as the pre-compensation signal, which is $x_{ds}^{(k)} - u_{ds}^{(k)}$ (as shown in 260 in FIG. 2c). While the signal $u_{ds}^{(k)}$ is known through the QAM modulator input bit stream (which would be, e.g. 8 bit per tone and line for the 8 bit QAM constellation), the remaining pre-compensation signal $x_{ds}^{(k)} - u_{ds}^{(k)}$ follows a Gaussian distribution at higher frequencies (as shown in 262 in FIG. 2c) and an even sharper distribution at lower frequencies (as shown in 264 in FIG. 2c). The pre-compensation signal can be compressed efficiently, using lossy nonlinear quantization. Both signal components can be packed into a format of $b^{(k)}$ bits/carrier for the QAM signal and $b_{xtalk}^{(k)}$ bits/carrier and component (real/imaginary) for the pre-compensation signal. In this example embodiment, the signal decomposition method is implemented within the COM circuit 104. However, in other embodiments, the signal decomposition method may be implemented within the DPU circuits or the cloud, in order to compress the downstream data signals or the upstream data signals associated therewith.

Figures 3A, 3B:
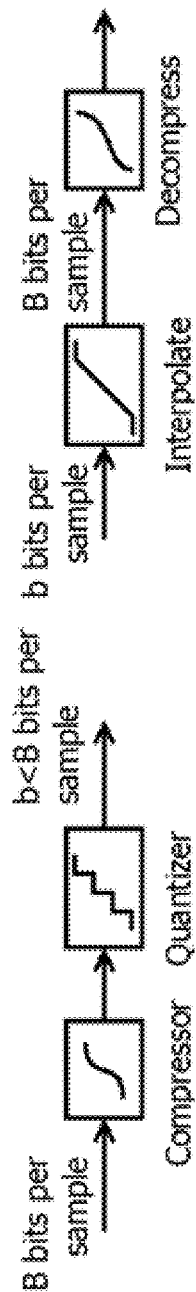
FIG. 3a illustrates simplified block diagram of an apparatus configured to compress data signals based on non-linear quantization, according to one embodiment of the disclosure.
FIG. 3b illustrates simplified block diagram of an apparatus configured to decompress data signals that are compressed based on non-linear quantization, according to one embodiment of the disclosure.
Figures 4A, 4B:
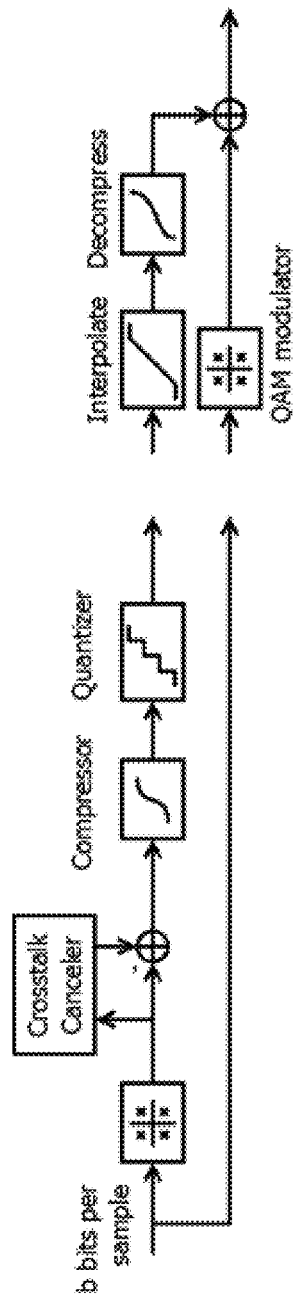
FIG. 4a illustrates simplified block diagram of an apparatus configured to compress data signals based on a combination of signal decomposition and non-linear quantization, according to one embodiment of the disclosure.
FIG. 4b illustrates simplified block diagram of an apparatus configured to decompress data signals that are compressed based on a combination of signal decomposition and non-linear quantization, according to one embodiment of the disclosure.

Alternately, in some embodiments, the signals (e.g., the downstream data signals or the upstream data signals) may be compressed based on nonlinear quantization. In some embodiments, nonlinear quantization can take advantage of any signal which doesn't follow a uniform distribution, e.g., Gaussian signals by adjusting the quantization thresholds such that the quantization error is reduced. In some embodiments, the quantization method utilized comprises Lloyd-Max method, where the decision thresholds as well as the signal levels corresponding to each quantized level are iteratively optimized. However, other quantization techniques may be utilized. A simplified approach which achieves a similar result uses a nonlinear compressor function in advance to a uniform quantization, as shown in FIG. 3a. The nonlinear function can be approximated with a piece-wise linear function. Examples for such functions are the tan h function, which is the optimal compressor function for Gaussian signals or the logarithmic function, which gives a mantissa-exponent result (as it is used for speech compression). Nonlinear quantization on a Gaussian signal can achieve SNR gains around 3 dB, depending on the selected saturation threshold. In some embodiments, FIG. 3b illustrates a method for decompression of the compressed signals. In some embodiments, the signal compression based on nonlinear quantization may be implemented within the DPU circuits or the COM circuit 104 or the cloud (i.e., the CM circuit 102), in order to compress the downstream data signals or the upstream data signals associated therewith. Another alternate approach uses a combination of the signal decomposition and nonlinear quantization, as shown in FIG. 4a. The advantage of the combined approach is that the compressed data rate scales with the actual bandwidth of the link according to the constellation size used as well as with the signal power of the residual signal. In some embodiments, FIG. 4b illustrates a method to decompress the compressed signals. In cases with high bit allocation on many carriers and for high crosstalk cases, however, nonlinear quantization of the full signal, gives a higher compression rate.

Discontinuous operation (DO) is a method to discontinue data transmission on the copper link for short periods of time in case that the data traffic required on a line is less than the available physical layer data rate. In such embodiments, crosstalk cancellation is reconfigured accordingly. In some embodiments, discontinuous operation can help to reduce bandwidth on the fiber link 112 (and the fiber link 114, in some embodiments), because for the discontinued transmission time on a line (i.e., the copper line), no data exchange between the COM circuit 104 and DPU circuits is required. Especially in case in which multiple DPUs/FEs are connected with the same passive optical network (PON) fiber (e.g., the fiber link 112) and the bandwidth between the DPUs is shared, DO can help to connect more DPUs and perform a certain virtual oversubscription of the fiber. In some embodiments, dynamic resource allocation must be coordinated for the fiber and the copper links to ensure that the fiber bandwidth is available for the symbol positions which carry data. In some embodiments, therefore, the COM circuit 104 is configured to schedule downstream data transmission on the fiber link 112 according to the discontinuous operation schedule on the copper lines.

Figure 5B:
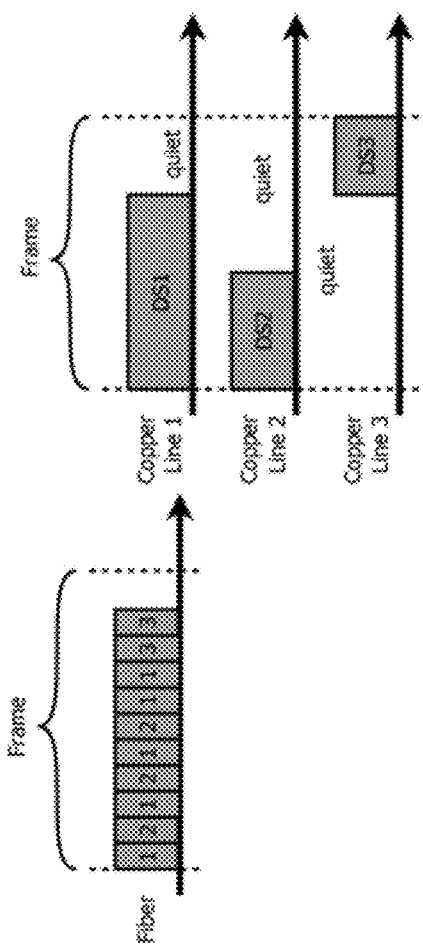
FIG. 5b illustrates another possible implementation of transmit time allocation of data symbols on fiber, according to one embodiment of the disclosure.
Figure 5A:
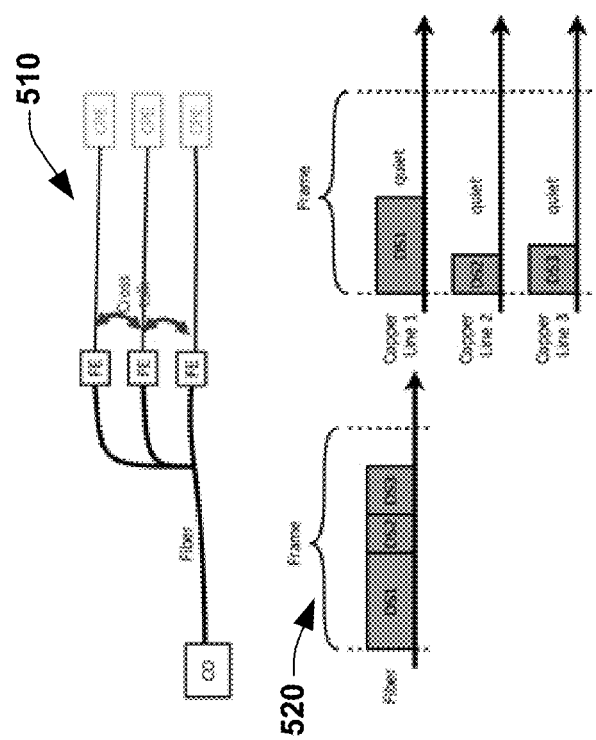
FIG. 5a illustrates one possible implementation of transmit time allocation of data symbols on fiber, according to one embodiment of the disclosure.

In some embodiments, the data is processed (e.g., modulation, crosstalk cancellation) at the CO (e.g., the COM circuit 104) and then packed into data frames that supply multiple FE-CPE lines as shown in 510 in FIG. 5a. In particular, FIG. 5a gives an example for 3 FE-CPE lines in which data symbols are packed into data blocks, each block per FE-CPE line to be transmitted over the fiber. Each fiber link converts that to the corresponding DMT/OFDM signals on the copper lines. In some embodiments, the COM circuit 104 is further configured to synchronize the timing of the DMT symbols on the copper lines in the way that it matches the crosstalk cancellation done previously at the CO side. In some embodiments, the COM circuit 104 is further configured to arrange the data blocks for transmission over the fiber link in a way that reduces delay at the FE (or the DPU) side. The arrangement in 520 in FIG. 5a may result in bigger delays and requires bigger buffers at the FE side. An alternative implementation is shown in FIG. 5b, where the data packets of different FE-CPE lines are interleaved on the fiber. In some embodiments, interleaving the data packets on fiber enables to reduce the delay at the FE side. In some embodiments, in order to use the copper channel more efficiently, the transmit time allocation on the copper line can be done such that crosstalk between different transmissions is reduced, as shown in FIG. 5b. For example, as shown in FIG. 5b, the COM circuit 104 may be configured to allocate the transit time of the different copper lines in a way that there is lesser overlap between the data packets on different copper lines. In case that the requested data rates on the copper links exceed the capabilities of the fiber, the dynamic resource allocation (DRA) may limit the copper link data rates accordingly. In some embodiments, DRA engine may be part of the COM circuit 104 or in the CM circuit 102.

Figure 6:
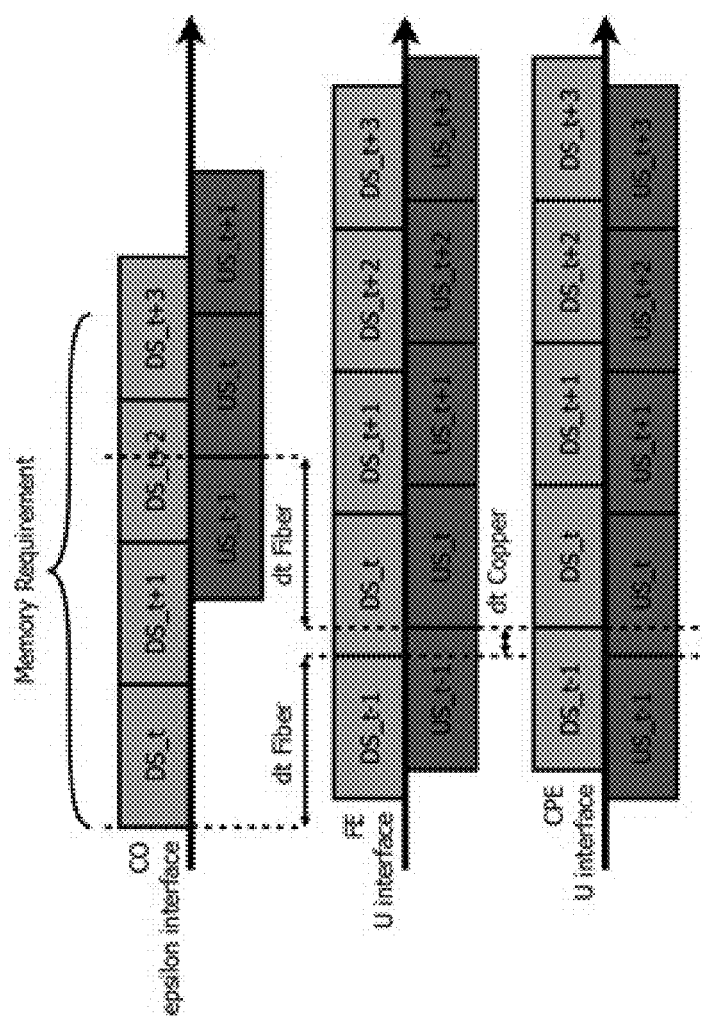
FIG. 6 illustrates a timing diagram of crosstalk cancellation at a central office management (COM) circuit, according to one embodiment of the disclosure.

In some embodiments, for each individual line associated with the DPU circuits, the delays caused by the fiber link have to be compensated, in order to perform efficient crosstalk cancellation. In some embodiments, the delay caused by the fiber is compensated based on utilizing buffers of sufficient size and appropriate timing settings between the CPE (i.e., the modem circuit) and the DPU, in order to cancel near-end crosstalk. In the example of FIG. 6, a fiber delay of more than 1 DPU symbol is illustrated. In some embodiments, this delay results in the requirement to keep 3 additional DS symbols in memory (at the DPU) to cancel NEXT and echo into the corresponding US symbol. In some embodiments, this timing is determined by the required timing at the CPE (i.e., the modem), which should allow echo cancellation. In some embodiments, the upstream data symbols and downstream data signals should not be shifted in time by more than the selected cyclic extension. Further, in some embodiments, this CPE timing should be aligned in all lines subject for mutual crosstalk. As the delays in the fiber towards different DPUs/FEs may be different, the delay differences between different downstream symbols have to be compensated. Therefore, in some embodiments, the CM circuit 102 or the COM circuit 104 is further configured to compensate the delay differences between the downstream symbols associated with different DPU lines. In some embodiments, the CM circuit 102 or the COM circuit 104 is further configured to compensate the delay differences between the upstream symbols associated with different DPU lines.

Figure 7:
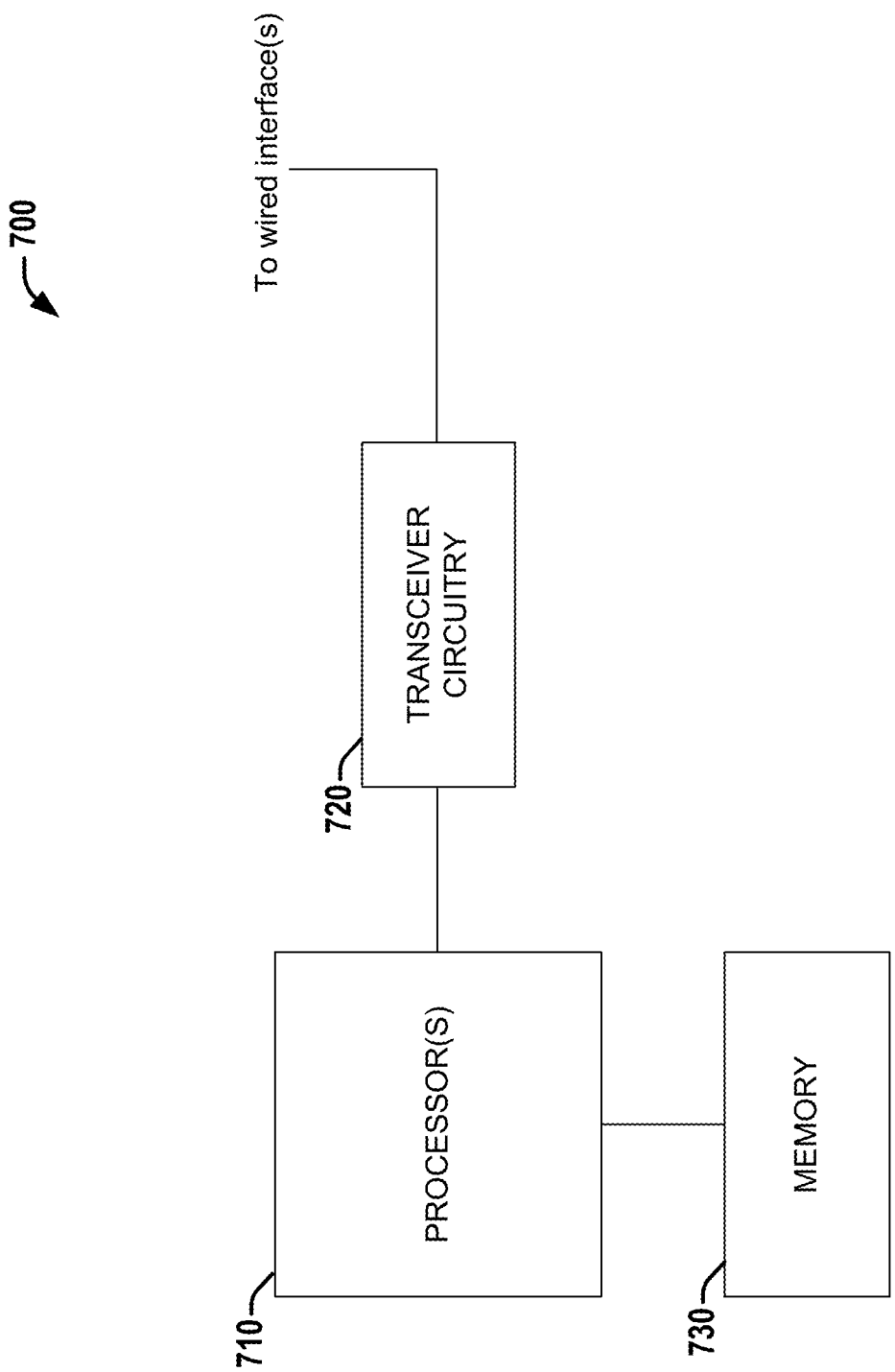
FIG. 7 illustrates a simplified block diagram of an apparatus for use in a distribution point unit (DPU) circuit associated with a wireline communication system, according to various embodiments described herein.

FIG. 7 illustrates a simplified block diagram of an apparatus 700 for use in a distribution point unit (DPU) circuit associated with a wireline communication system, according to various embodiments described herein. In some embodiments, the DPU circuit comprises one or more lines configured to be coupled respectively to one or more modem circuits associated therewith. In some embodiments, the DPU circuit is further configured to couple to a central office management (COM) circuit over fiber. In some embodiments, the apparatus 700 could be included within the DPU circuit 106a or the DPU circuit 106b in FIG. 1. The apparatus 700 is explained herein with reference to the DPU circuit 106a of FIG. 1. However, in other embodiments, the apparatus 700 can be explained with reference to any DPU circuits (e.g., the DPU circuit 106b in FIG. 1). The apparatus 700 includes a processing circuit 710, a transceiver circuit 720 (which can facilitate communication of data via one or more networks in some aspects) and a memory circuit 730 (which can comprise any of a variety of storage mediums and can store instructions and/or data associated with at least one of the processor 710 or transceiver circuitry 720). In some embodiments, the transceiver circuit 720 may include, inter alia, down-mixers, filters, and A/D converters to convert the high frequency upstream communication to digital data, such as baseband data for example. Further, in some embodiments, the transceiver circuit 720 may include, inter alia, up-mixers, filters, and D/A converters to convert digital data, such as baseband data for example, to high frequency downstream communication.

In one embodiment, the transceiver circuitry 720 passes the digital data to the processing circuit 710. However, in other embodiments, the A/D conversion and the D/A conversion may take place within the processing circuit 710. In some embodiments, the transceiver circuit 720 can comprise a receiver circuit and a transmitter circuit. In some embodiments, the processing circuit 710 can include one or more processors. In some embodiments, the one or more processors can be integrated on a single chip. However, in other embodiments, the one or more processors can be embedded on different chips. In some embodiments, the memory circuit 730 comprises a computer readable storage device that includes instructions to be executed by the processor 710. In some embodiments, the memory circuit 730 can be an independent circuit and in other embodiments, the memory circuit 730 can be integrated on chip with the processor 710. Alternately, in other embodiments, the instructions to be executed by the processor 710 can be stored on a non-transitory storage medium like ROM, flash drive etc., and can be downloaded to the memory circuit 730 for execution. In some embodiments, the memory circuit 730 can comprise one or more memory circuits. In some embodiments, the one or more memory circuits can be integrated on a single chip. However, in other embodiments, the one or more memory circuits can be embedded on different chips. As described in greater detail below, apparatus 700 enables to virtualize some of the signal processing tasks associated with the DPU circuits.

In some embodiments, the processing circuit 710 is configured to receive, via the transceiver circuit 720, one or more upstream data signals (e.g., the first upstream data signal 113a and the second upstream data signal 115a) associated with one or more modem circuits (e.g., the modem circuit 108a and the modem circuit 108b) respectively coupled to one or more lines (e.g., the copper line 110a and the copper line 110b) associated with the processing circuit 710. In some embodiments, the processing circuit 710 is configured to receive the one or more upstream data signals in analog domain (e.g., as analog signals) from the respective modem circuits. Upon receiving the upstream data signals, in some embodiments, the processing circuit 710 is further configured to provide, via the transceiver circuit 720, the one or more upstream data signals in digital domain or analog domain to a COM circuit (e.g., the COM circuit 104 in FIG. 1) over a fiber link (e.g., the fiber link 112). In some embodiments, the DPU circuit 106a is further configured to perform one or more of the signal processing operations comprising optical modulation, analog to digital conversion (A/D conversion), time domain (TD) filtering, fast Fourier transform (FFT), frequency domain (FD) equalization, on the upstream data signals, prior to providing the one or more upstream data signals to the COM circuit.

For example, in one embodiment, if the processing circuit 710 is configured to provide the upstream data signals in digital domain (e.g., as time domain (TD) samples) over the fiber link (e.g., the fiber link 112), the processing circuit 710 may be configured to perform analog to digital conversion and time domain (TD) filtering of the one or more upstream data signals received from the modem circuits, prior to providing the upstream data signals to the COM/CM circuit. Further, in some embodiments, if the processing circuit 710 is configured to provide the upstream data signals in digital domain (e.g., as frequency domain (FD) samples) over the fiber link 112, the processing circuit 710 may be configured to perform analog to digital conversion, time domain (TD) filtering, fast fourier transform (FFT) and frequency domain (FD) equalization of the upstream data signals received from the modem circuits, prior to providing the upstream data signals to the COM circuit.

In some embodiments, the processing circuit 710 is further configured to provide one or more downstream data signals (e.g., the first downstream data signal 113b and the second downstream data signal 115b), via the transceiver circuit 720, to the one or more modem circuits (e.g., the modem circuit 108a and the modem circuit 108b) respectively coupled to one or more lines (e.g., the copper line 110a and the copper line 110b) associated with the processing circuit 710. In some embodiments, the processing circuit 710 is configured to provide the one or more downstream data signals to the respective modem circuits in analog domain (e.g., as analog signals). In some embodiments, the processing circuit 710 is configured to receive, via the transceiver circuit 720, the one or more downstream data signals, in digital domain or analog domain, from the COM circuit. Upon receiving the one or more downstream data signals, in some embodiments, the processing circuit 710 is further configured to perform one or more of the signal processing operations comprising frequency domain (FD) equalization, inverse fast Fourier transform (IFFT), time domain (TD) filtering, digital to analog (D/A) conversion and optical demodulation, on the one or more downstream data signals, prior to providing the one or more downstream data signals to the respective modem circuits.

For example, in some embodiments, if the processing circuit 710 is configured to receive the one or more downstream data signals in digital domain (e.g., as TD samples) over the fiber link 112, the processing circuit 710 may be configured to perform TD filtering and D/A conversion on the one or more downstream data signals (in order to generate analog signals), prior to providing the one or more downstream data signals to the respective modem circuits. Similarly, in some embodiments, if the processing circuit 710 is configured to receive the one or more downstream data signals in digital domain (e.g., as FD samples) over the fiber link 112, the processing circuit 710 may be configured to perform IFFT, TD filtering and D/A conversion on the one or more downstream data signals, prior to providing the one or more downstream data signals to the respective modem circuits, as explained above with respect to FIG. 1. Further, in some embodiments, if the processing circuit 710 is configured to receive the one or more downstream data signals in analog domain over the fiber link 112, the processing circuit 710 may be configured to perform optical demodulation on the one or more downstream data signals, prior to providing the one or more downstream data signals to the respective modem circuits.

In some embodiments, the processing circuit 710 is further configured to perform crosstalk cancellation, based on processing the one or more upstream data signals and the one or more downstream data signals, as explained above with respect to FIG. 1. In some embodiments, the crosstalk cancellation comprises one or more of a near end cross talk (NEXT) cancellation, far end crosstalk (FEXT) cancellation and echo cancellation. In some embodiments, the processing circuit 710 is configured to perform the crosstalk cancellation based on processing the one or more upstream data signals and the one or more downstream data signals, in frequency domain (i.e., using digital FD samples). However, in other embodiments, the processing circuit 710 may be configured to perform the crosstalk cancellation based on processing the one or more upstream data signals and the one or more downstream data signals, in time domain (i.e., using digital TD samples). In some embodiments, the processing circuit 710 is further configured to establish a timing reference, to enable to adjust a timing associated with both the upstream data signals and the downstream data signals associated with the DPU circuit (e.g., the DPU circuit 106a in FIG. 1), in order to enable an efficient cross talk cancellation within the DPU circuit. In some embodiments, the processing circuit 710 is further configured to compress the one or more upstream data signals, prior to providing the one or more upstream data signals to the COM circuit over fiber.

Figure 8:
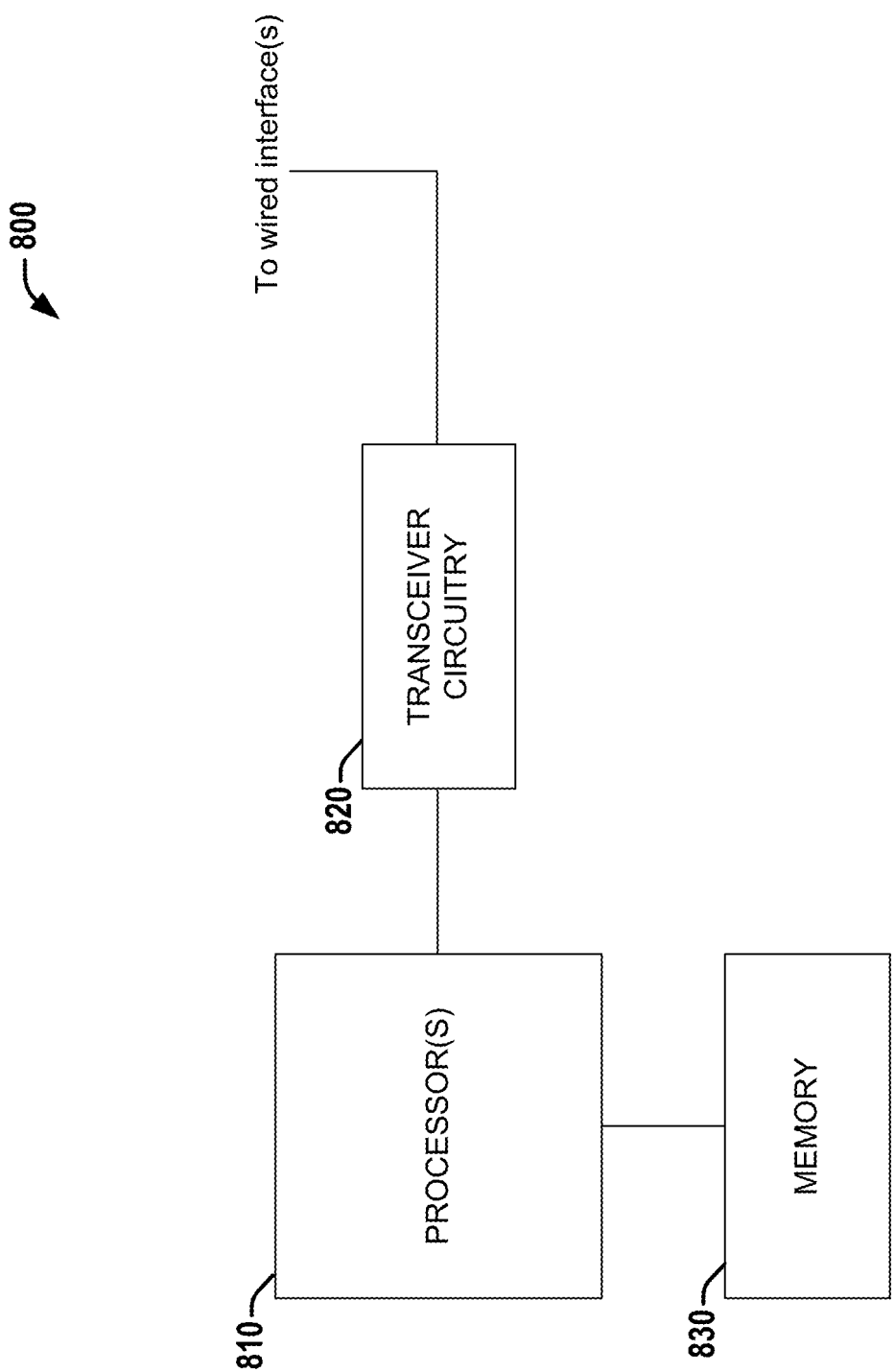
FIG. 8 illustrates a simplified block diagram of an apparatus for use in a central office management (COM) circuit associated with a wireline communication system, according to various embodiments described herein.

FIG. 8 illustrates a simplified block diagram of an apparatus 800 for use in a central office management (COM) circuit associated with a wireline communication system, according to various embodiments described herein. In some embodiments, the COM circuit comprises an equipment comprising a plurality of components located at a central location of a communication system and is configured to communicate with one or more DPUs. However, in other embodiments, the COM circuit may be located at a location different from the central location, for example, a communication node or the cloud. In some embodiments, the COM circuit is further configured to communicate with a cloud management (CM) circuit (in the embodiments where the COM circuit is located at a central location different from the cloud). In some embodiments, the apparatus 800 could be included within the COM circuit 104 in FIG. 1. The apparatus 800 is explained herein with reference to the COM circuit 104 of FIG. 1. However, in other embodiments, the apparatus 800 can be explained with reference to any COM circuit associated with wireline communication systems. The apparatus 800 includes a processing circuit 810, a transceiver circuit 820 (which can facilitate communication of data via one or more networks in some aspects) and a memory circuit 830 (which can comprise any of a variety of storage mediums and can store instructions and/or data associated with at least one of the processor 810 or transceiver circuitry 820). In some embodiments, the transceiver circuit 820 may include, inter alia, down-mixers, filters, and A/D converters to convert the high frequency upstream communication to digital data, such as baseband data for example. Further, in some embodiments, the transceiver circuit 820 may include, inter alia, up-mixers, filters, and D/A converters to convert digital data, such as baseband data for example, to high frequency downstream communication.

In one embodiment, the transceiver circuitry 820 passes the digital data to the processing circuit 810. However, in other embodiments, the A/D conversion and the D/A conversion may take place within the processing circuit 810. In some embodiments, the transceiver circuit 820 can comprise a receiver circuit and a transmitter circuit. In some embodiments, the processing circuit 810 can include one or more processors. In some embodiments, the one or more processors can be integrated on a single chip. However, in other embodiments, the one or more processors can be embedded on different chips. In some embodiments, the memory circuit 830 comprises a computer readable storage device that includes instructions to be executed by the processor 810. In some embodiments, the memory circuit 830 can be an independent circuit and in other embodiments, the memory circuit 830 can be integrated on chip with the processor 810. Alternately, in other embodiments, the instructions to be executed by the processor 810 can be stored on a non-transitory storage medium like ROM, flash drive etc., and can be downloaded to the memory circuit 830 for execution. In some embodiments, the memory circuit 830 can comprise one or more memory circuits. In some embodiments, the one or more memory circuits can be integrated on a single chip. However, in other embodiments, the one or more memory circuits can be embedded on different chips. As described in greater detail below, apparatus 800 enables to virtualize some of the signal processing tasks associated with the DPU circuits.

In some embodiments, the processing circuit 810 is configured to process one or more upstream data signals (e.g., the first upstream data signal 113a, the second upstream data signal 115a and the third upstream data signal 117a), received from a set of DPU circuits (e.g., the DPU circuit 106a and the DPU circuit 106b), via the transceiver circuit 820. In some embodiments, the set of DPU circuits comprises one or more DPU circuits. In some embodiments, the one or more upstream data signals are associated with one or more modem circuits (e.g., the modem circuits 108a, 108b and 108c in FIG. 1) coupled respectively to one or more lines associated with the set of DPU circuits. In some embodiments, the processing circuit 810 is configured to receive the upstream data signals, in digital domain or analog domain. In some embodiments, the processing circuit 810 is further configured to process the one or more upstream data signals and perform one or more of the signal processing operations comprising analog to digital (A/D) conversion, time domain (TD) filtering, fast Fourier transform (FFT), frequency domain (FD) equalization, quadrature amplitude modulation (QAM) demodulation, constellation shaping, inner forward error correction (FEC) decoding, outer FEC decoding and data encapsulation, on the received one or more upstream data signals. Upon performing the one or more of the signal processing operations on the one or more upstream data signals, in some embodiments, the processing circuit 810 is further configured to provide the one or more upstream data signals to the CM circuit. However, in other embodiments, the processing circuit 810 may be configured process the one or more upstream data signals and convey the received one or more upstream data signals to the CM circuit 102, without performing any signal processing tasks.

In some embodiments, the processing circuit 810 is further configured to process one or more downstream data signals (e.g., the first downstream data signal 113b, the second downstream data signal 115b and third downstream data signal 117b) to be provided to the set of DPU circuits (e.g., the DPU circuit 106a and the DPU circuit 106b), via the transceiver circuit 820, over the fiber link 112. In some embodiments, the one or more downstream data signals are associated with the one or more modem circuits coupled respectively to the one or more lines associated with the set of DPU circuits. In some embodiments, the processing circuit 810 is configured to receive the one or more downstream data signals from the cloud management (CM) circuit (e.g., the CM circuit 102 in FIG. 1). In some embodiments, the processing circuit 810 is further configured to process the one or more downstream data signals and perform one or more of the signal processing operations comprising data de-capsulation, inner forward error correction (FEC) encoding, outer FEC encoding, constellation shaping, quadrature amplitude modulation (QAM) modulation, frequency domain (FD) equalization, inverse fast fourier transform (IFFT), time domain (TD) filtering, digital to analog (D/A) conversion, on the downstream data signals, prior to providing the downstream data signals to the set of DPU circuits. However, in other embodiments, the processing circuit 810 may be configured to process the one or more downstream data signals and convey the one or more downstream data signals to the respective DPU circuits, without performing any signal processing tasks.

In some embodiments, the processing circuit 810 is further configured to perform crosstalk cancellation (NEXT/FEXT/echo) based on processing the one or more upstream data signals and the one or more downstream data signals. In some embodiments, the processing circuit 810 is configured to perform the crosstalk cancellation in digital domain (e.g., using TD samples or FD samples). For example, in the upstream direction, if the processing circuit 810 receives the upstream data signals from the set of DPU circuits in analog domain, the processing circuit 810 may be configured to perform A/D conversion and TD filtering, on the upstream data signals in order to perform cross talk cancellation using TD samples. In some embodiments, the processing circuit 810 may be further configured to perform FFT on the TD samples to generate FD samples and FD equalization, in order to perform crosstalk cancellation in FD domain. However, in some embodiments, if the processing circuit 810 receives upstream data signals as FD samples, the processing circuit 810 can perform crosstalk cancellation using the FD samples without any further signal processing. In some embodiments, the processing circuit 810 may be further configured to provide the FD samples to the CM circuit 102 for further processing. In some embodiments, however, the processing circuit 810 may be further configured to perform one or more of the signal processing operations on the FD samples comprising quadrature amplitude modulation (QAM) demodulation, constellation shaping, inner forward error correction (FEC) decoding, outer FEC decoding and data encapsulation, in order to generate layer 2 data packets. Upon generating the layer 2 data packets, in some embodiments, the processing circuit 810 may be further configured to provide the upstream data packets to the CM circuit 102. In different embodiments, however, the processing circuit 810 may be configured to provide the one or more upstream data signals to the CM circuit (with or without performing crosstalk cancellation) as FD samples or TD samples or in analog domain.

Similarly, in the downstream direction, if the processing circuit 810 receives the downstream data signals as layer 2 data packets (e.g., from the CM circuit 102), the processing circuit 810 may be configured to perform data de-capsulation, outer FEC encoding, constellation shaping, inner forward error correction (FEC) encoding, quadrature amplitude modulation (QAM) modulation and frequency domain (FD) equalization, in order to perform cross talk cancellation using FD samples. In some embodiments, the processing circuit 810 may be further configured to perform IFFT on the FD samples to generate TD samples and TD filtering, in order to perform crosstalk cancellation in TD domain. However, in some embodiments, if the processing circuit 810 receives the downstream data signals as FD samples from the CM circuit 102, the processing circuit 810 may be configured to perform crosstalk cancellation directly on the FD samples, without performing any further signal processing operations. In some embodiments, the processing circuit 810 may be configured provide the FD samples directly to the respective DPU circuits over the fiber link 112. However, in other embodiments, the processing circuit 810 may be further configured to perform one or more signal processing tasks comprising IFFT, TD filtering and D/A conversion on the FD samples, prior to providing the FD samples to the respective DPU circuits. In different embodiments, however, the processing circuit 810 may be configured to provide the one or more downstream signals to the DPU circuits (with or without performing crosstalk cancellation) as TD samples or FD samples or in analog domain.

In some embodiments, the processing circuit 810 is configured to perform the crosstalk cancellation between the one or more upstream data signals and the one or more downstream data signals based on predetermined cancellation matrices, stored within the memory circuit 830, as explained above with respect to FIG. 1. In some embodiments, performing the crosstalk cancellation comprises generating one or more precoded downstream data signals (e.g., precompensated downstream signal $x_{ds}^{(k)}$ in equation (1) above), respectively based on the one or more downstream data signals, in accordance with a predefined far end crosstalk (FEXT) cancellation relation, based on the predetermined cancellation matrices, as explained above in equation (1). In some embodiments, performing the crosstalk cancellation further comprises generating one or more crosstalk compensated upstream data signals (e.g., $\hat{u}_{us}^{(k)}$ in equation (2) above) respectively based on the one or more upstream data signals and the one or more downstream data signals, in accordance with a predefined near end crosstalk (NEXT) cancellation relation, based on the predetermined cancellation matrices, as explained above in equation (2). In some embodiments, the processing circuit 810 is further configured to update/determine the predefined cancellation matrices. In some embodiments, the processing circuit 810 is configured to update/determine the predefined cancellation matrices based on receiving updated cancellation matrices from the CM circuit. However, in other embodiments, the processing circuit 810 may be configured to update/determine predefined cancellation matrices within the processing circuit 810. In some embodiments, the processing circuit 810 is further configured to compress the downstream data signals, prior to providing the downstream data signals to the DPU circuit over fiber, as explained above with respect to FIG. 1.

Figure 9:
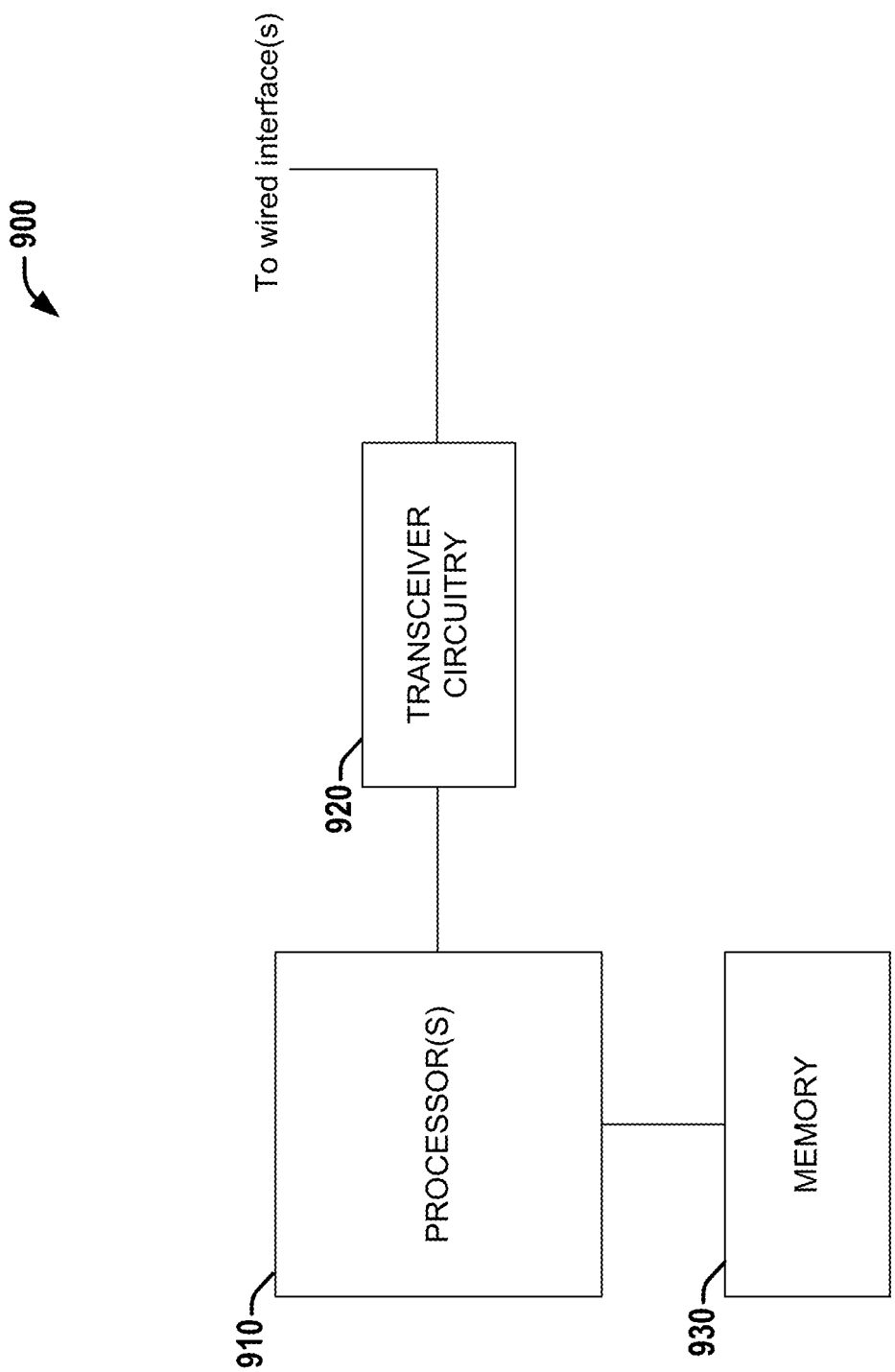
FIG. 9 illustrates a simplified block diagram of an apparatus for use in a cloud management (CM) circuit associated with a wireline communication system, according to various embodiments described herein.

FIG. 9 illustrates a simplified block diagram of an apparatus 900 for use in a cloud management (CM) circuit associated with a wireline communication system, according to various embodiments described herein. In some embodiments, the CM circuit comprises an equipment comprising a plurality of components located at a head-end location (e.g., the cloud) of a communication system and is configured to couple with COM circuits, in order to communicate with the DPUs. In some embodiments, however, the CM circuit may be configured to couple directly to the DPUs and may be configured to communicate directly with the DPUs. In some embodiments, the apparatus 900 could be included within the CM circuit 102 in FIG. 1. The apparatus 900 is explained herein with reference to the CM circuit 102 of FIG. 1. However, in other embodiments, the apparatus can be explained with reference to any CM circuit associated with wireline communication systems. The apparatus 900 includes a processing circuit 910, a transceiver circuit 920 (which can facilitate communication of data via one or more networks in some aspects) and a memory circuit 930 (which can comprise any of a variety of storage mediums and can store instructions and/or data associated with at least one of the processor 910 or transceiver circuitry 920). In some embodiments, the transceiver circuit 920 may include, inter alia, down-mixers, filters, and A/D converters to convert the high frequency upstream communication to digital data, such as baseband data for example. Further, in some embodiments, the transceiver circuit 920 may include, inter alia, up-mixers, filters, and D/A converters to convert digital data, such as baseband data for example, to high frequency downstream communication.

In one embodiment, the transceiver circuitry 920 passes the digital data to the processing circuit 910. However, in other embodiments, the A/D conversion and the D/A conversion may take place within the processing circuit 910. In some embodiments, the transceiver circuit 920 can comprise a receiver circuit and a transmitter circuit. In some embodiments, the processing circuit 910 can include one or more processors. In some embodiments, the one or more processors can be integrated on a single chip. However, in other embodiments, the one or more processors can be embedded on different chips. In some embodiments, the memory circuit 930 comprises a computer readable storage device that includes instructions to be executed by the processor 910. In some embodiments, the memory circuit 930 can be an independent circuit and in other embodiments, the memory circuit 930 can be integrated on chip with the processor 910. Alternately, in other embodiments, the instructions to be executed by the processor 910 can be stored on a non-transitory storage medium like ROM, flash drive etc., and can be downloaded to the memory circuit 930 for execution. In some embodiments, the memory circuit 930 can comprise one or more memory circuits. In some embodiments, the one or more memory circuits can be integrated on a single chip. However, in other embodiments, the one or more memory circuits can be embedded on different chips. As described in greater detail below, apparatus 900 enables to virtualize some of the signal processing tasks associated with the DPU circuits.

In some embodiments, the processing circuit 910 is configured to receive one or more upstream data signals (e.g., the first upstream data signal 113a, the second upstream data signal 115a and the third upstream data signal 117a) from a COM circuit (e.g., the COM circuit 104 in FIG. 1) via the transceiver circuit 920. In some embodiments, the processing circuit 910 is configured to receive the one or more upstream data signals from the COM circuit over a fiber link (e.g., the fiber link 114 in FIG. 1). In some embodiments, the processing circuit 910 is configured to receive the one or more upstream data signals, in digital domain or analog domain. However, in other embodiments, the processing circuit 910 may be configured to receive the upstream data signals as layer 2 data packets from the COM circuit. In some embodiments, the one or more upstream data signals are associated with one or more modem circuits (e.g., the modem circuits 108a, 108b and 108c in FIG. 1) coupled respectively to one or more lines (e.g., the copper lines 110a, 110b and 110c in FIG. 1) associated with a set of DPU circuits (e.g., the DPU circuit 106a and the DPU circuit 106b) coupled to the COM circuit. In some embodiments, the set of DPU circuits comprises one or more DPU circuits. In the embodiments where the processing circuit 910 is configured to receive the upstream data signals in digital domain or in analog domain, the processing circuit 910 is further configured to perform one or more of the signal processing operations comprising analog to digital (A/D) conversion, time domain (TD) filtering, fast fourier transform (FFT), frequency domain (FD) equalization, quadrature amplitude modulation (QAM) demodulation, constellation shaping, inner forward error correction (FEC) decoding, outer FEC decoding and data encapsulation, on the received one or more upstream data signals. In some embodiments, the processing circuit 910 is configured to perform one or more of the signal processing operations on the one or more upstream data signals, in order to generate layer 2 data packets.

In some embodiments, the processing circuit 910 is further configured to provide one or more downstream data signals (e.g., the first downstream data signal 113b, the second downstream data signal 115b and the third downstream data signal 117b) to the COM circuit over fiber (e.g., the fiber link 114 in FIG. 1), via the transceiver circuit 920. In some embodiments, the one or more downstream data signals are associated with the one or more modem circuits coupled respectively to the one or more lines associated with the set of DPU circuits coupled to the COM circuit. In some embodiments, the one or more downstream data signals are available at the processing circuit 910 as layer 2 data packets. In some embodiments, the processing circuit 910 is configured to provide the one or more downstream data signals to the COM circuit in digital domain or analog domain. However, in other embodiments, the processing circuit 910 may be configured to provide the downstream data signals to the COM circuit as layer 2 data packets. In some embodiments, for example, where the processing circuit is configured to provide the downstream data signals to the COM circuit in digital domain or analog domain, the processing circuit 910 is further configured to perform one or more of the signal processing operations comprising data de-capsulation, inner forward error correction (FEC) encoding, outer FEC encoding, constellation shaping, quadrature amplitude modulation (QAM) modulation, frequency domain (FD) equalization, inverse fast fourier transform (IFFT), time domain (TD) filtering, digital to analog (D/A) conversion, on the one or more downstream data signals, prior to providing the one or more downstream data signals to the COM circuit.

In some embodiments (e.g., in the embodiments where crosstalk cancellation is not performed at the COM circuit), the processing circuit 910 is further configured to perform crosstalk cancellation. In some embodiments, the crosstalk cancellation comprises one or more of a near end cross talk (NEXT) cancellation, far end crosstalk (FEXT) cancellation and echo cancellation. In some embodiments, the processing circuit 910 is configured to perform crosstalk cancellation based on processing the one or more upstream data signals and the one or more downstream data signals. In some embodiments, the processing circuit 910 is configured to perform the crosstalk cancellation between the one or more upstream data signals and the one or more downstream data signals based on predefined cancellation matrices, stored within the memory circuit 930, as explained above with respect to FIG. 1. In some embodiments, the processing circuit 910 is further configured to update/determine the predefined cancellation matrices. Upon determining the predefined cancellation matrices, in some embodiments (e.g., in embodiments where crosstalk cancellation is performed at the COM circuit or the DPU circuit), the processing circuit 910 is further configured to provide the updated cancellation matrices to the COM circuit or the DPU circuits (e.g., the DPU circuit 106a in FIG. 1), in order to enable the COM circuit or the DPU circuits to perform crosstalk cancellation.

In some embodiments, the processing circuit 910 is configured to perform the crosstalk cancellation in digital domain (e.g., using TD samples or FD samples). For example, in the upstream direction, if the processing circuit 910 receives the upstream data signals in analog domain, the processing circuit 910 may be configured to perform A/D conversion and TD filtering, in order to perform cross talk cancellation using TD samples. In some embodiments, the processing circuit 910 may be further configured to perform FFT on the TD samples to generate FD samples and also perform FD equalization, in order to perform crosstalk cancellation in FD domain. However, in some embodiments, if the processing circuit 910 receives upstream data signals as FD samples, the processing circuit 910 can perform crosstalk cancellation without any further signal processing. In some embodiments, upon performing crosstalk cancellation, the processing circuit 910 may be further configured to perform one or more of the signal processing operations on the FD samples comprising quadrature amplitude modulation (QAM) demodulation, constellation shaping, inner forward error correction (FEC) decoding, outer FEC decoding and data encapsulation, in order to generate layer 2 data packets.

Similarly, in the downstream direction, the processing circuit 910 may be configured to perform data de-capsulation, outer FEC encoding, constellation shaping, inner forward error correction (FEC) encoding, quadrature amplitude modulation (QAM) modulation and frequency domain (FD) equalization, on the layer 2 data packets, in order to perform cross talk cancellation using FD samples. In some embodiments, the processing circuit 910 may be further configured to perform IFFT on the FD samples to generate TD samples and also perform TD filtering, in order to perform crosstalk cancellation in TD domain. In some embodiments, the processing circuit 910 may be configured provide the FD samples directly to the COM circuit over the fiber link. However, in other embodiments, the processing circuit 910 may be further configured to perform one or more signal processing tasks comprising IFFT, TD filtering and D/A conversion on the FD samples, provide the downstream data signals as TD samples or in analog domain to the COM circuit.

Figure 10:
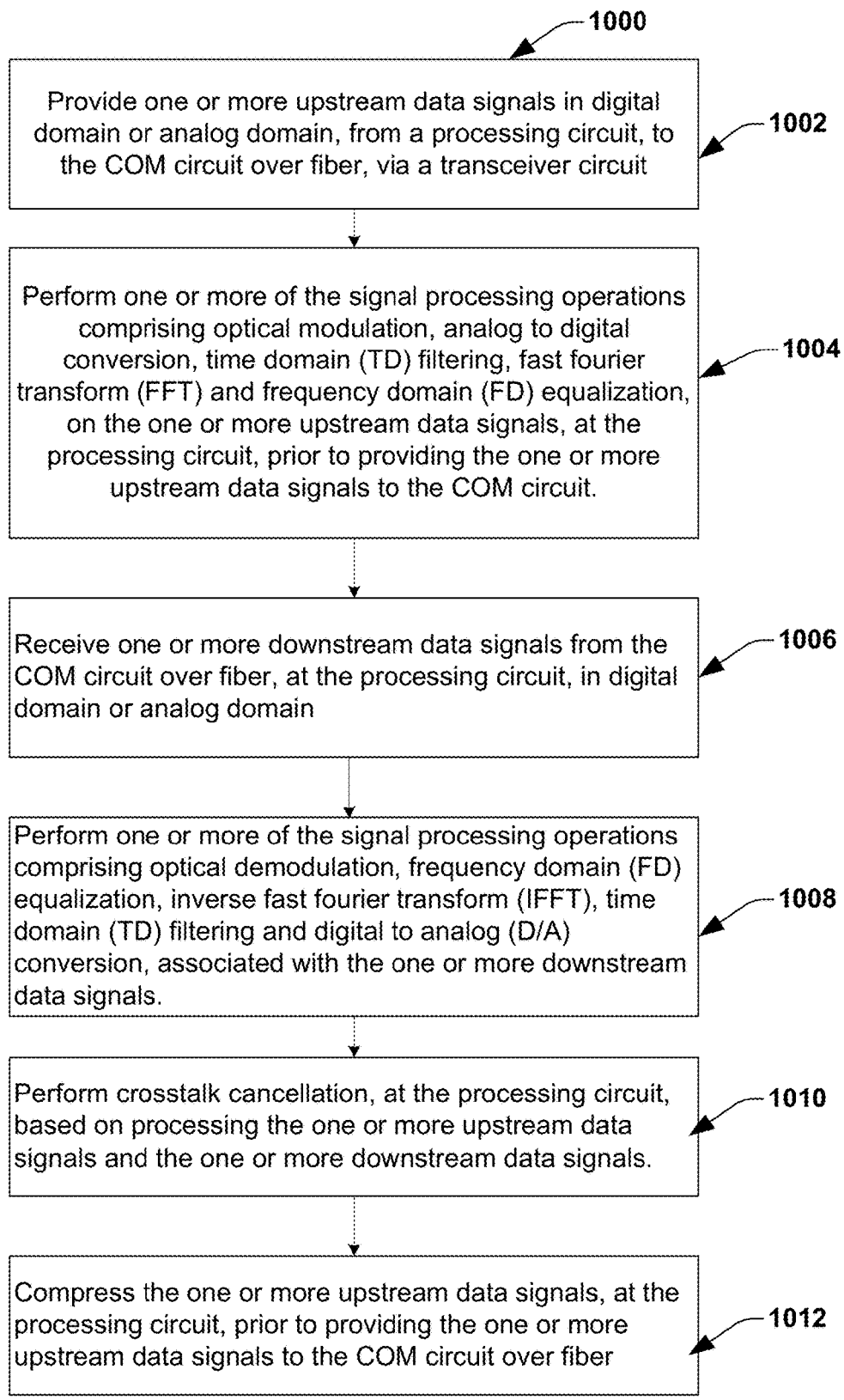
FIG. 10 illustrates a flow chart of a method for a distribution point unit (DPU) circuit in a wireline communication system, according to one embodiment of the disclosure.

FIG. 10 illustrates a flow chart of a method 1000 for a distribution point unit (DPU) circuit in a wireline communication system, according to one embodiment of the disclosure. The method 1000 is explained herein with reference to the apparatus 700 in FIG. 7. In some embodiments, the apparatus 700 could be included within the first DPU circuit 106a in FIG. 1. At 1002, one or more upstream data signals (e.g., the first upstream data signal 113a and the second upstream data signal 115a in FIG. 1) is provided from the processing circuit 710, in digital domain or analog domain, to the COM circuit (e.g., the COM circuit 104 in FIG. 1) over fiber (e.g., the fiber link 112), via the transceiver circuit 720. In some embodiments, the one or more upstream signals is associated with one or more lines associated with the DPU circuit which are respectively coupled to modem circuits (e.g., the modem circuit 108a and the modem circuit 108b). At 1004, one or more of the signal processing operations comprising optical modulation, analog to digital conversion, time domain (TD) filtering, fast fourier transform (FFT) and frequency domain (FD) equalization, is performed on the one or more upstream data signals, at the processing circuit 710, prior to providing the one or more upstream data signals to the COM circuit over fiber. In some embodiments, the one or more upstream data signals is received at the processing circuit 710 from the respective modem circuits in analog domain (e.g., as analog signals).

At 1006, one or more downstream data signals (e.g., the first downstream data signal 113b and the second downstream data signal 115b in FIG. 1) is received at the processing circuit 710 from the COM circuit over fiber, in digital domain or analog domain, via the transceiver circuit 720. In some embodiments, upon receiving the one or more downstream data signals, the processing circuit 710 is configured to provide the one or more downstream data signals to respective modem circuits over copper lines (e.g., the copper line 110a and the copper line 110b), in analog domain. At 1008, one or more of the signal processing operations comprising optical demodulation, frequency domain (FD) equalization, inverse fast Fourier transform (IFFT), time domain (TD) filtering and digital to analog (D/A) conversion, are performed on the one or more downstream data signals, at the processing circuit 710, in order to provide the one or more downstream data signals to the respective modem circuits in analog domain.

Figure 2A:
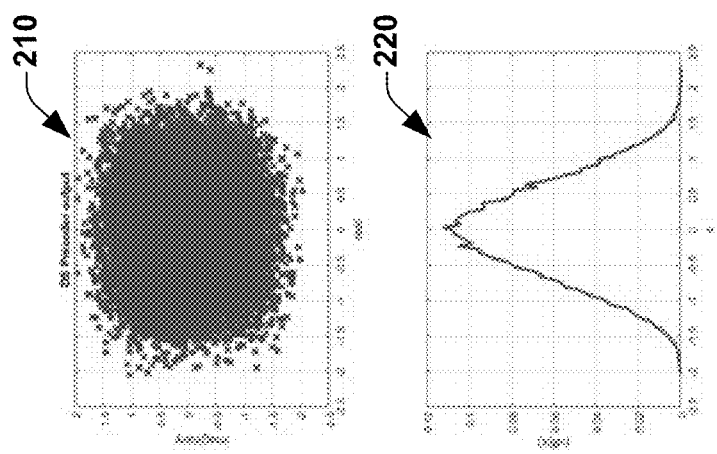

At 1010, crosstalk cancellation is performed at the processing circuit 710, based on processing the one or more upstream data signals and the one or more downstream data signals. In some embodiments, the crosstalk cancellation comprises one or more of a near end cross talk (NEXT) cancellation, far end crosstalk (FEXT) cancellation and echo cancellation. In some embodiments, the crosstalk cancellation is performed within the processing circuit 710, based on equations (1) and (2) as explained above with respect to FIG. 1. In some embodiments, instructions to execute the equations (1) and (2) are stored within the memory circuit 730. In some embodiments, the crosstalk cancellation is performed at the processing circuit 710, in digital domain (e.g., using time domain (TD) samples or frequency domain (FD) samples). At 1012, the one or more upstream data signals is compressed at the processing circuit 710, prior to providing the one or more upstream data signals to the COM circuit over fiber. In some embodiments, the processing circuit 710 is configured to compress the one or more upstream data signals based on using the signal decomposition method shown in FIGS. 2a, 2b and 2c above, or based on the nonlinear quantization method, as explained above with respect to FIG. 3a. However, other signal compression methods different from above (e.g., as shown in FIG. 4a above), are also contemplated to be within the scope of this disclosure. In some embodiments, the processing circuit 710 is further configured to establish a timing reference, to enable to adjust a timing associated with both the upstream data signals and the downstream data signals associated with the DPU circuit, in order to enable an efficient crosstalk cancellation.

Figure 11:
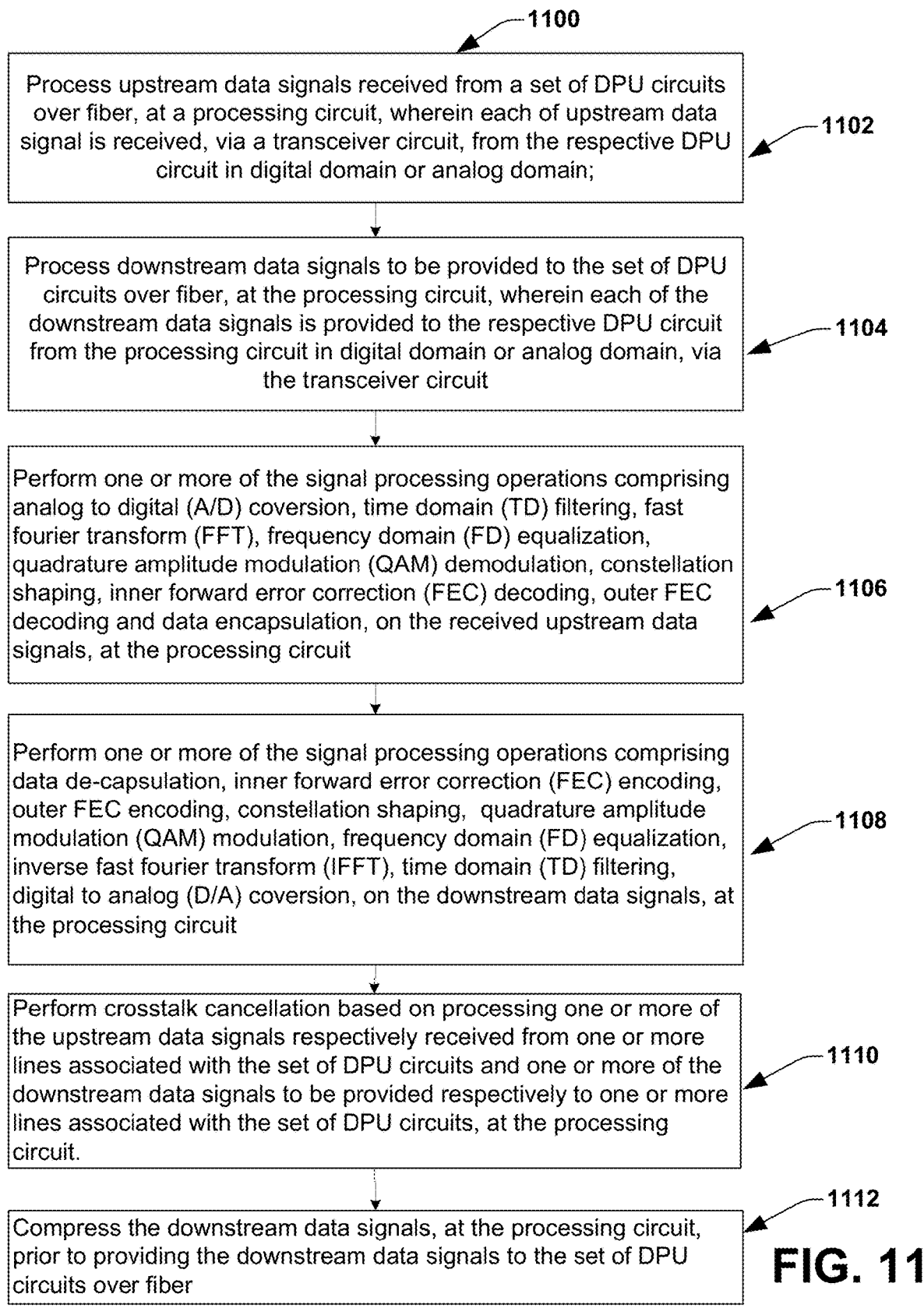
FIG. 11 illustrates a flow chart of a method for a central office management (COM) circuit in a wireline communication system, according to one embodiment of the disclosure.

FIG. 11 illustrates a flow chart of a method 1100 for a central office management (COM) circuit in a wireline communication system, according to one embodiment of the disclosure. The method 1100 is explained herein with reference to the apparatus 800 in FIG. 8. In some embodiments, the apparatus 800 could be included within the COM circuit 104 in FIG. 1. At 1102, one or more upstream data signals (e.g., the first upstream data signal 113a, the second upstream data signal 115a and the third upstream data signal 117a in FIG. 1) received from a set of DPU circuits (e.g., the DPU circuit 106a and the DPU circuit 106b) over fiber (e.g., the fiber link 112 in FIG. 1), via the transceiver circuit 820, are processed at the processing circuit 810. In some embodiments, each of one or more upstream data signals is received, at the processing circuit 810, from the respective DPU circuit in digital domain or analog domain. In some embodiments, the one or more upstream data signals are associated with one or more modem circuits (e.g., the modem circuits 108a, 108b and 108c in FIG. 1) coupled respectively to one or more lines associated with the set of DPU circuits. At 1104, one or more downstream data signals (e.g., the first downstream data signal 113b, the second downstream data signal 115b and the third downstream data signal 117b in FIG. 1) to be provided to the set of DPU circuits over fiber, is processed at the processing circuit 810. In some embodiments, each of the one or more downstream data signals is provided to the respective DPU circuit from the processing circuit 810, in digital domain or analog domain, via the transceiver circuit 820. In some embodiments, the one or more downstream data signals are associated with the one or more modem circuits coupled respectively to the one or more lines associated with the set of DPU circuits. In some embodiments, the one or more downstream data signals are received at the processing circuit 810 from a CM circuit (e.g., the CM circuit 102 in FIG. 1) in analog domain or digital domain or as layer 2 data packets.

At 1106, one or more of the signal processing operations comprising analog to digital (A/D) conversion, time domain (TD) filtering, fast Fourier transform (FFT), frequency domain (FD) equalization, quadrature amplitude modulation (QAM) demodulation, constellation shaping, inner forward error correction (FEC) decoding, outer FEC decoding and data encapsulation, are performed on the received one or more upstream data signals, at the processing circuit 810. In some embodiments, the processing circuit 810 is further configured to provide the one or more upstream data signals to the CM circuit (e.g., the CM circuit 102 in FIG. 1) in analog domain or digital domain or as layer 2 data packets. At 1108, one or more of the signal processing operations comprising data de-capsulation, inner forward error correction (FEC) encoding, outer FEC encoding, constellation shaping, quadrature amplitude modulation (QAM) modulation, frequency domain (FD) equalization, inverse fast Fourier transform (IFFT), time domain (TD) filtering, digital to analog (D/A) conversion, on the one or more downstream data signals, at the processing circuit 820, prior to providing the one or more downstream data signals to the respective DPU circuits. In some embodiments, the processing circuit 810 is configured to provide the one or more downstream data signals to the DPU circuits in analog domain or digital domain.

At 1110, crosstalk cancellation is performed at the processing circuit 810 based on processing the one or more of the upstream data signals respectively received from one or more lines associated with the set of DPU circuits and one or more of the downstream data signals to be provided respectively to one or more lines associated with the set of DPU circuits. In some embodiments, the crosstalk cancellation comprises one or more of a near end cross talk (NEXT) cancellation, far end crosstalk (FEXT) cancellation and echo cancellation. In some embodiments, the processing circuit 810 is configured to perform the crosstalk cancellation between the one or more upstream data signals and the one or more downstream data signals based on predetermined cancellation matrices. In some embodiments, the crosstalk cancellation is performed within the processing circuit 810, based on equations (1) and (2) as explained above with respect to FIG. 1. In some embodiments, instructions to execute the equations (1) and (2) are stored within the memory circuit 830. In some embodiments, the crosstalk cancellation is performed at the processing circuit 810, in digital domain (e.g., using time domain (TD) samples or frequency domain (FD) samples). In some embodiments, the processing circuit 810 is further configured to determine/update the cancellation matrices.

At 1112, the one or more downstream data signals are compressed at the processing circuit 810, prior to providing the one or more downstream data signals to the set of DPU circuits over fiber. In some embodiments, the processing circuit 810 is configured to compress the one or more downstream data signals based on using the signal decomposition method shown in FIGS. 2a, 2b and 2c above, or based on the nonlinear quantization method, as explained above with respect to FIG. 3a. However, other signal compression methods different from above (e.g., as shown in FIG. 4a above), are also contemplated to be within the scope of this disclosure. Further, in some embodiments, the processing circuit 810 is configured to compensate the delay differences between the downstream symbols of downstream data signals associated with different DPU lines, as explained above with respect to FIG. 6. In some embodiments, the processing circuit 810 is configured to compensate the delay differences between the upstream symbols of upstream data signals associated with different DPU lines, as explained above with respect to FIG. 6. In some embodiments, the processing circuit 810 is further configured to schedule a transmission of each of the downstream data signals to a respective DPU circuit, in accordance with a discontinuation operation schedule of the modem circuits configured to receive the respective downstream data signals, as explained above with respect to FIG. 5a and FIG. 5b above.

Figure 12:
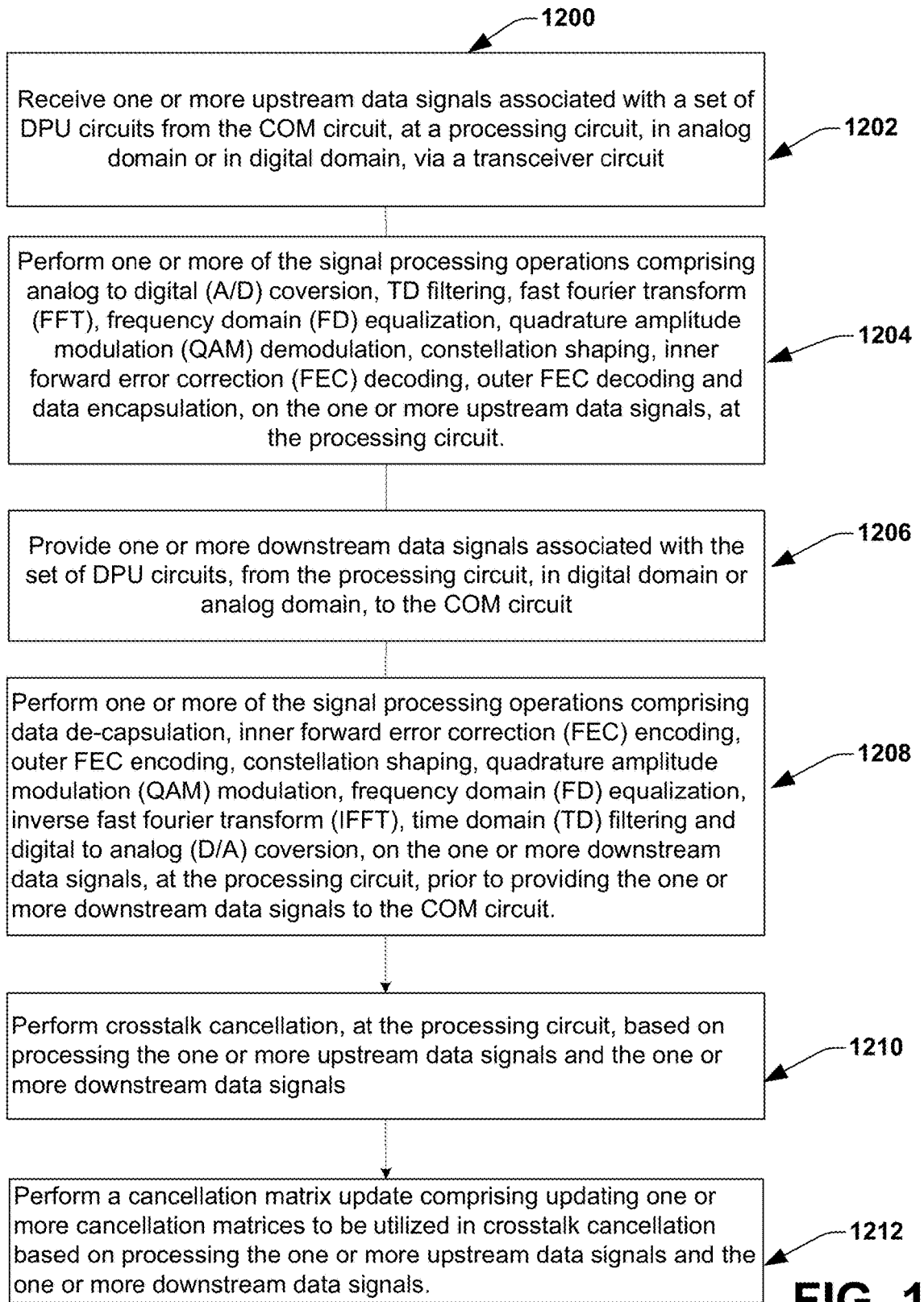
FIG. 12 illustrates a flow chart of a method for a cloud management (CM) circuit in a wireline communication system, according to one embodiment of the disclosure.

FIG. 12 illustrates a flow chart of a method 1200 for a cloud management (CM) circuit in a wireline communication system, according to one embodiment of the disclosure. The method 1200 is explained herein with reference to the apparatus 900 in FIG. 9. At 1202, one or more upstream data signals (e.g., the first upstream data signal 113a, the second upstream data signal 115a and the third upstream data signal 117a in FIG. 1) is received at the processing circuit 910, from a COM circuit (e.g., the COM circuit 104 in FIG. 1), in analog domain or in digital domain, via the transceiver circuit 920. However, in some embodiments, the one or more upstream data signals may be received at the processing circuit 910 as layer 2 data packets. In some embodiments, the one or more upstream data signals are associated with one or more modem circuits (e.g., the modem circuits 108a, 108b and 108c in FIG. 1) coupled respectively to one or more lines (e.g., the copper lines 110a, 110b and 110c in FIG. 1) associated with a set of DPU circuits (e.g., the DPU circuit 106a and the DPU circuit 106b) coupled to the COM circuit. At 1204, one or more of the signal processing operations comprising analog to digital (A/D) conversion, TD filtering, fast Fourier transform (FFT), frequency domain (FD) equalization, quadrature amplitude modulation (QAM) demodulation, constellation shaping, inner forward error correction (FEC) decoding, outer FEC decoding and data encapsulation, is performed on the one or more upstream data signals (for example, in embodiments where the one or more upstream data signals are received in analog domain or digital domain), at the processing circuit 910, upon receiving the one or more upstream data signals.

At 1206, one or more downstream data signals (e.g., the first downstream data signal 113b, the second downstream data signal 115b and the third downstream data signal 117b in FIG. 1) are provided from the processing circuit 910, in digital domain or analog domain, to the COM circuit (e.g., the COM circuit 104 in FIG. 1), via the transceiver circuit 920. However, in some embodiments, the one or more downstream data signals may be provided to the processing circuit 910 as layer 2 data packets. In some embodiments, the one or more downstream data signals are associated with the one or more modem circuits coupled respectively to one or more lines associated with the set of DPU circuits coupled to the COM circuit. At 1208, one or more of the signal processing operations comprising data de-capsulation, inner forward error correction (FEC) encoding, outer FEC encoding, constellation shaping, quadrature amplitude modulation (QAM) modulation, frequency domain (FD) equalization, inverse fast Fourier transform (IFFT), time domain (TD) filtering and digital to analog (D/A) conversion, are performed on the one or more downstream data signals (for example, in embodiments where the one or more downstream data signals are provided in analog domain or digital domain), at the processing circuit 910, prior to providing the one or more downstream data signals to the COM circuit.

At 1210, crosstalk cancellation is performed at the processing circuit 910, based on processing the one or more upstream data signals and the one or more downstream data signals. In some embodiments, the crosstalk cancellation comprises one or more of a near end cross talk (NEXT) cancellation, far end crosstalk (FEXT) cancellation and echo cancellation. In some embodiments, the processing circuit 810 configured to perform the crosstalk cancellation between the one or more upstream data signals and the one or more downstream data signals based on predetermined cancellation matrices. In some embodiments, the crosstalk cancellation is performed within the processing circuit 910, based on equations (1) and (2) as explained above with respect to FIG. 1. In some embodiments, instructions to execute the equations (1) and (2) are stored within the memory circuit 930. In some embodiments, the crosstalk cancellation is performed at the processing circuit 910, in digital domain (e.g., using time domain (TD) samples or frequency domain (FD) samples). At 1212, a cancellation matrix update comprising updating/determining one or more cancellation matrices to be utilized in crosstalk cancellation is performed at the processing circuit 910, based on processing the one or more upstream data signals and the one or more downstream data signals. In some embodiments, the processing circuit 910 is further configured to provide the determined cancellation matrices to the COM circuit/the DPU circuits, in order to enable the COM circuit/DPU circuits to perform crosstalk cancellation.

While the methods are illustrated and described above as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

Figure 13:
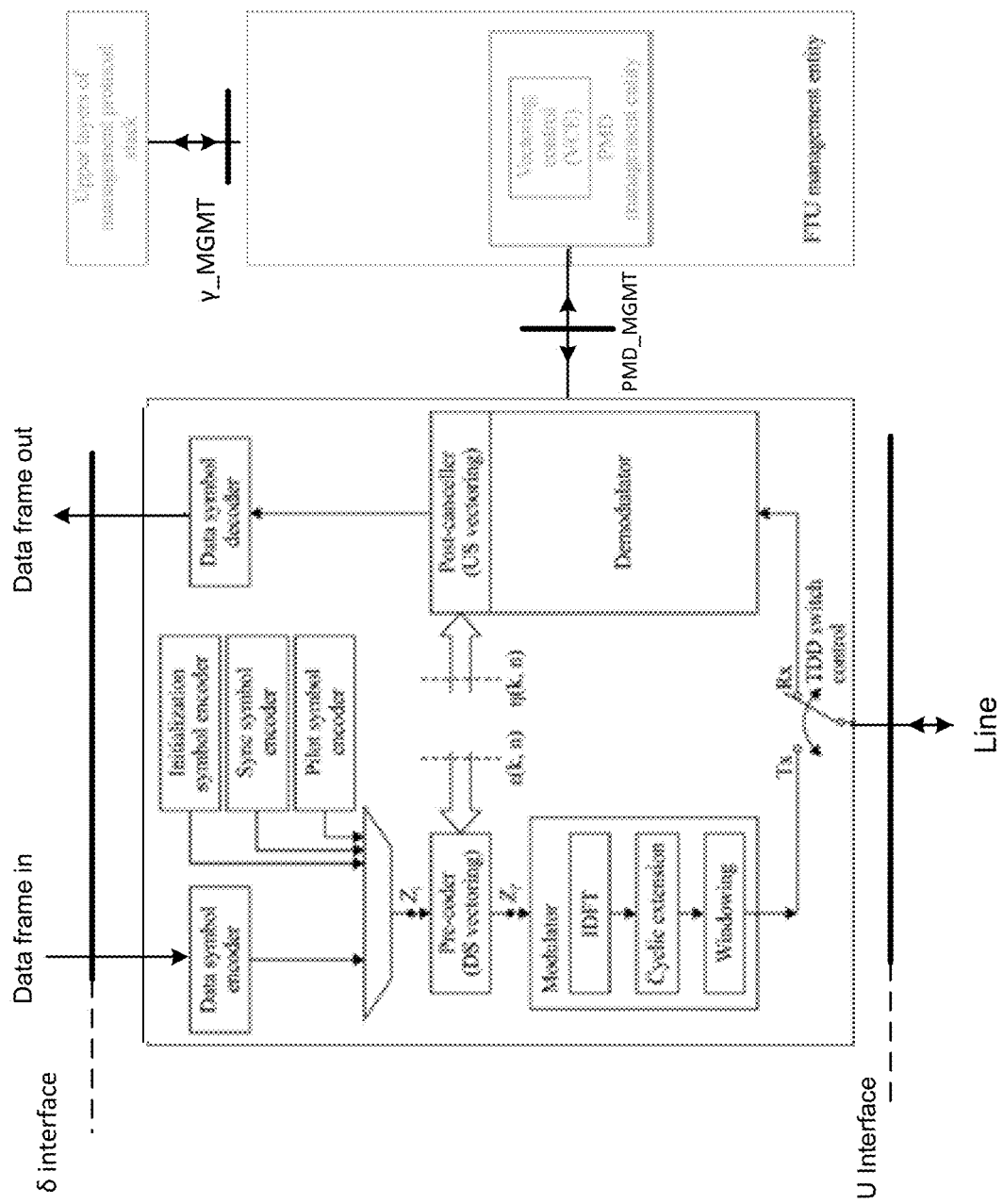
FIG. 13 illustrates a functional reference model of a physical medium dependent layer (PMD) of G.fast or MGFAST Recommendation, according to various embodiments described herein.

FIG. 13 illustrates a functional reference model of a physical medium dependent layer (PMD) of G.fast or MGFAST Recommendation (as referenced in ITU G.9701 standard), according to various embodiments described herein. In some embodiments, the interface between different DPUs may be defined at ε(k, n) and η(k, n) reference points, which provide signal samples from other lines in the aim to cancel FEXT. In some embodiments, signal samples from other lines and from the own transmission allow to cancel echo and NEXT caused by use of full-duplex transmission. In some embodiments, signal samples associated with multiple DPUs/FEs are only available at the central point (CO or the cloud), and have to be delivered there via fiber. In some embodiments, a full set of frequency domain samples in TX and RX directions shall be communicated through the fiber to the CO or the cloud, in order to enable FEXT/NEXT/echo cancellation at the CO or the cloud. In some embodiments, the set of frequency domain samples corresponds to reference point of $Z_i$, the transmitter and peer point (input of the post-canceller) of the receiver. However, in other embodiments, any reference point below $Z_i$, of the transmitter and, respectively, below the input of the post-canceller of the receiver, can serve as well. One possibility is the Tx and Rx points after the "TDD switch control" in FIG. 13. In different embodiments different demarcation points can be used. Use of particular demarcation point is a tradeoff between complexity left at the DPU and transmission capacity required for the fiber.

Figure 14:
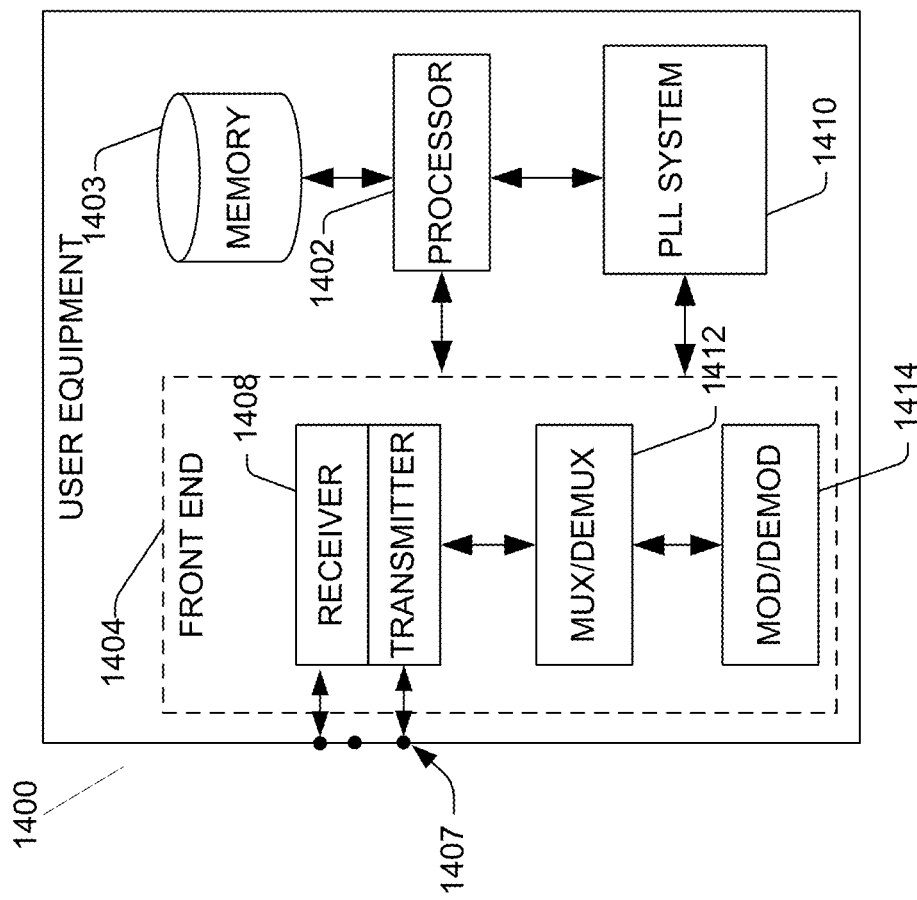
FIG. 14 illustrates a block diagram of an embodiment of a device, according to the various embodiments described herein.

To provide further context for various aspects of the disclosed subject matter, FIG. 14 illustrates a block diagram of an embodiment of device 1400 (e.g., a modem, a cable modem or gateway, etc.) related to access of a network (e.g., base station, wireless access point, femtocell access point, and so forth) that can enable and/or exploit features or aspects of the disclosed aspects.

The device 1400 can be utilized with one or more aspects (e.g., the CM circuit 102 in FIG. 1, the COM circuit 104 in FIG. 1, the DPU circuits 106a and 106b in FIG. 1, and the modem circuits 108a, 108b and 108c in FIG. 1) of communication networks described herein according to various aspects. The user device 1400, for example, comprises a digital baseband processor 1402 that can be coupled to a data store or memory 1403 and a front end 1404 (e.g., an RF front end, an acoustic front end, an optical front end, or the other like front end). The device 1400 further comprises one or more input/output ports 1407 configured to receive and transmit signals to and from one or more devices such as access points, access terminals, wireless ports, routers and so forth, which can operate within a radio access network or other communication network generated via a network device (not shown).

The device 1400 can be a radio frequency (RF) device for communicating RF signals, an acoustic device for communicating acoustic signals, an optical device for communicating optical signals, or any other signal communication device, such as a computer, a personal digital assistant, a mobile phone or smart phone, a tablet PC, a modem, a notebook, a router, a switch, a repeater, a PC, network device, base station or a like device that can operate to communicate with a network or other device according to one or more different communication protocols or standards.

The front end 1404 can include a communication platform, which comprises electronic components and associated circuitry that provide for processing, manipulation or shaping of the received or transmitted signals via one or more receivers or transmitters (e.g. transceivers) 1408, a mux/demux component 1412, and a mod/demod component 1414. The front end 1404 is coupled to the digital baseband processor 1402 and the set of input/output ports 1407. The front end 1404 may be configured to perform the remodulation techniques described herein to extend the frequency range of the device 1400. In one aspect, the user equipment device 1400 can comprise a phase locked loop system 1410.

The processor 1402 can confer functionality, at least in part, to substantially any electronic component within the mobile communication device 1400, in accordance with aspects of the disclosure. As an example, the processor 1402 can be configured to execute, at least in part, executable instructions that cause the front end to remodulate signals to selected frequencies. The processor 1402 is functionally and/or communicatively coupled (e.g., through a memory bus) to memory 1403 in order to store or retrieve information necessary to operate and confer functionality, at least in part, to communication platform or front end 1404, the phase locked loop system 1410 and substantially any other operational aspects of the phase locked loop system 1410. The phase locked loop system 1410 includes at least one oscillator (e.g., a VCO, DCO or the like) that can be calibrated via core voltage, a coarse tuning value, signal, word or selection process.

The processor 1402 can operate to enable the mobile communication device 1400 to process data (e.g., symbols, bits, or chips) for multiplexing/demultiplexing with the mux/demux component 1412, or modulation/demodulation via the mod/demod component 1414, such as implementing direct and inverse fast Fourier transforms, selection of modulation rates, selection of data packet formats, inter-packet times, etc. Memory 1403 can store data structures (e.g., metadata), code structure(s) (e.g., modules, objects, classes, procedures, or the like) or instructions, network or device information such as policies and specifications, attachment protocols, code sequences for scrambling, spreading and pilot (e.g., reference signal(s)) transmission, frequency offsets, cell IDs, and other data for detecting and identifying various characteristics related to RF input signals, a power output or other signal components during power generation.

While the apparatus has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is a central office management (COM) circuit associated with a communication system configured to couple to a set of distribution point unit (DPU) circuits over fiber, the COM circuit comprising a memory configured to store a plurality of instructions; and one or more processors configured to retrieve the plurality of instructions from the memory, and upon execution of the plurality of instructions is configured to process one or more upstream data signals received from the set of DPU circuits over fiber, wherein the one or more upstream data signals are associated with one or more modem circuits coupled respectively to one or more lines associated with the set of DPU circuits and wherein each of upstream data signals is received, at the one or more processors, from a respective DPU circuit, in digital domain or analog domain; and process one or more downstream data signals to be provided to the set of DPU circuits over fiber, wherein the one or more downstream data signals are associated with the one or more modem circuits coupled respectively to the one or more lines associated with the set of DPU circuits, and wherein each of the downstream data signals is provided, from the one or more processors, to a respective DPU circuit, in digital domain or analog domain; wherein the one or more downstream data signals and the one or more upstream data signals are processed, in order to enable to perform one or more signal processing operations associated with the one or more downstream data signals and the one or more upstream data signals.

Example 2 is a COM circuit, including the subject matter of example 1, wherein the one or more processors is further configured to perform one or more of the signal processing operations comprising analog to digital (A/D) coversion, time domain (TD) filtering, fast fourier transform (FFT), frequency domain (FD) equalization, quadrature amplitude modulation (QAM) demodulation, constellation shaping, inner forward error correction (FEC) decoding, outer FEC decoding and data encapsulation, on the received one or more upstream data signals.

Example 3 is a COM circuit, including the subject matter of examples 1-2, including or omitting elements, wherein the one or more processors is further configured to perform one or more of the signal processing operations comprising data de-capsulation, inner forward error correction (FEC) encoding, outer FEC encoding, constellation shaping, quadrature amplitude modulation (QAM) modulation, frequency domain (FD) equalization, inverse fast fourier transform (IFFT), time domain (TD) filtering, digital to analog (D/A) coversion, on the downstream data signals, prior to providing the downstream data signals to the set of DPU circuits.

Example 4 is a COM circuit, including the subject matter of examples 1-3, including or omitting elements, wherein the one or more processors is further configured to perform crosstalk cancellation based on processing the one or more of the upstream data signals and the one or more of the downstream data signals, when the DPU circuits within the set of DPU circuits have crosstalk associated therewith.

Example 5 is a COM circuit, including the subject matter of examples 1-4, including or omitting elements, wherein the one or more processors is configured to perform the crosstalk cancellation between the one or more upstream data signals and the one or more downstream data signals in digital domain.

Example 6 is a COM circuit, including the subject matter of examples 1-5, including or omitting elements, wherein the crosstalk cancellation comprises one or more of a near end cross talk (NEXT) cancellation, far end crosstalk (FEXT) cancellation and echo cancellation.

Example 7 is a COM circuit, including the subject matter of examples 1-6, including or omitting elements, wherein the one or more processors is configured to perform the crosstalk cancellation between the one or more upstream data signals and the one or more downstream data signals based on predetermined cancellation matrices.

Example 8 is a COM circuit, including the subject matter of examples 1-7, including or omitting elements, wherein performing the crosstalk cancellation comprises generating one or more precoded downstream data signals respectively based on the one or more downstream data signals, in accordance with a predefined far end crosstalk (FEXT) cancellation relation, based on the predetermined cancellation matrices.

Example 9 is a COM circuit, including the subject matter of examples 1-8, including or omitting elements, wherein performing the crosstalk cancellation comprises generating one or more crosstalk compensated upstream data signals respectively based on the one or more upstream data signals and the one or more downstream data signals, in accordance with a predefined near end crosstalk (NEXT) cancellation relation, based on the predetermined cancellation matrices.

Example 10 is a COM circuit, including the subject matter of examples 1-9, including or omitting elements, wherein the one or more processors is further configured to update the predefined cancellation matrices.

Example 11 is a COM circuit, including the subject matter of examples 1-10, including or omitting elements, wherein the one or more processors is further configured to compress the one or more downstream data signals, prior to providing the one or more downstream data signals to the set of DPU circuits over fiber.

Example 12 is a distribution point unit (DPU) circuit associated with a communication system configured to be coupled to a central office management (COM) circuit over fiber, the DPU circuit comprising a memory configured to store a plurality of instructions; and one or more processors configured to retrieve the plurality of instructions from the memory, and upon execution of the plurality of instructions is configured to provide one or more upstream data signals in digital domain or analog domain, to the COM circuit over fiber, in order to enable the COM circuit to perform one or more signal processing operations on the upstream data signals; wherein the one or more upstream data signals are associated with one or more modem circuits respectively coupled to one or more lines associated with the DPU circuit.

Example 13 is a DPU circuit, including the subject matter of example 12, wherein the one or more processors is further configured to perform one or more of the signal processing operations comprising optical modulation, analog to digital conversion, time domain (TD) filtering, fast fourier transform (FFT) and frequency domain (FD) equalization, on the one or more upstream data signals, prior to providing the one or more upstream data signals to the COM circuit.

Example 14 is a DPU circuit, including the subject matter of examples 12-13, including or omitting elements, wherein the one or more processors is further configured to receive one or more downstream data signals from the COM circuit over fiber, in digital domain or analog domain, wherein the one or more downstream data signals are to be provided to the one or more modem circuits respectively coupled to the one or more lines associated with the DPU circuit.

Example 15 is a DPU circuit, including the subject matter of examples 12-14, including or omitting elements, wherein the one or more processors is further configured to perform one or more of the signal processing operations comprising optical demodulation, frequency domain (FD) equalization, inverse fast Fourier transform (IFFT), time domain (TD) filtering and digital to analog (D/A) conversion, on the one or more downstream data signals, prior to providing the one or more downstream data signals to the respective modem circuits.

Example 16 is a DPU circuit, including the subject matter of examples 12-15, including or omitting elements, wherein the one or more upstream data signals provided to the COM circuit comprise digital time domain (TD) signals.

Example 17 is a DPU circuit, including the subject matter of examples 12-16, including or omitting elements, wherein the one or more upstream data signals provided to the COM circuit comprise digital frequency domain (FD) signals.

Example 18 is a DPU circuit, including the subject matter of examples 12-17, including or omitting elements, wherein the one or more processors is further configured to perform crosstalk cancellation, based on processing the one or more upstream data signals and the one or more downstream data signals.

Example 19 is a DPU circuit, including the subject matter of examples 12-18, including or omitting elements, wherein the one or more processors is configured to perform the crosstalk cancellation based on processing the one or more upstream data signals and the one or more downstream data signals, in digital domain.

Example 20 is a DPU circuit, including the subject matter of examples 12-19, including or omitting elements, wherein the crosstalk cancellation comprises one or more of a near end cross talk (NEXT) cancellation, far end crosstalk (FEXT) cancellation and echo cancellation.

Example 21 is a DPU circuit, including the subject matter of examples 12-20, including or omitting elements, wherein the one or more processors is further configured to compress the one or more upstream data signals, prior to providing the one or more upstream data signals to the COM circuit over fiber.

Example 22 is a DPU circuit, including the subject matter of examples 12-21, including or omitting elements, wherein the one or more processors is further configured to establish a timing reference, to enable to adjust a timing associated with both the upstream data signals and the downstream data signals associated with the DPU circuit, in order to enable an efficient cross talk cancellation.

Example 23 is a cloud management (CM) circuit associated with a communication system configured to couple to a COM circuit over fiber, the CM circuit comprising a memory configured to store a plurality of instructions; and one or more processors configured to retrieve the plurality of instructions from the memory, and upon execution of the plurality of instructions is configured to receive one or more upstream data signals from the COM circuit in analog domain or in digital domain, wherein the one or more upstream data signals are associated with one or more modem circuits coupled respectively to one or more lines associated with a set of DPU circuits coupled to the COM circuit; and perform one or more of the signal processing operations comprising analog to digital (A/D) conversion, TD filtering, fast Fourier transform (FFT), frequency domain (FD) equalization, quadrature amplitude modulation (QAM) demodulation, constellation shaping, inner forward error correction (FEC) decoding, outer FEC decoding and data encapsulation, on the received one or more upstream data signals.

Example 24 is a CM circuit, including the subject matter of example 23, wherein the one or more processors is further configured to provide one or more downstream data signals to the COM circuit in digital domain or analog domain, wherein the one or more downstream data signals are associated with one or more modem circuits coupled respectively to one or more lines associated with the set of DPU circuits coupled to the COM circuit.

Example 25 is a CM circuit, including the subject matter of examples 23-24, including or omitting elements, wherein the one or more processors is further configured to perform one or more of the signal processing operations comprising data de-capsulation, inner forward error correction (FEC) encoding, outer FEC encoding, constellation shaping, quadrature amplitude modulation (QAM) modulation, frequency domain (FD) equalization, inverse fast fourier transform (IFFT), time domain (TD) filtering and digital to analog (D/A) coversion, on the one or more downstream data signals, prior to providing the one or more downstream data signals to the COM circuit.

Example 26 is a CM circuit, including the subject matter of examples 23-25, including or omitting elements, wherein the one or more processors is further configured to perform crosstalk cancellation based on processing the one or more upstream data signals and the one or more downstream data signals, when the DPU circuits associated with the set of DPU circuits have crosstalk associated therewith.

Example 27 is a CM circuit, including the subject matter of examples 23-26, including or omitting elements, wherein the one or more processors is configured to perform the cross talk cancellation in digital domain.

Example 28 is a CM circuit, including the subject matter of examples 23-27, including or omitting elements, wherein the crosstalk cancellation comprises one or more of a near end cross talk (NEXT) cancellation, far end crosstalk (FEXT) cancellation and echo cancellation.

Example 29 is a CM circuit, including the subject matter of examples 23-28, including or omitting elements, wherein the one or more processors is further configured to perform a cancellation matrix update comprising updating one or more cancellation matrices to be utilized in crosstalk cancellation based on processing the one or more upstream data signals and the one or more downstream data signals.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A central office management (COM) circuit associated with a communication system configured to couple to a set of distribution point unit (DPU) circuits over fiber, the COM circuit comprising:
a memory configured to store a plurality of instructions; and
one or more processors configured to retrieve the plurality of instructions from the memory, and upon execution of the plurality of instructions is configured to:
process one or more upstream data signals received from the set of DPU circuits over fiber, wherein the one or more upstream data signals are associated with one or more modem circuits coupled respectively to one or more lines associated with the set of DPU circuits and wherein each of upstream data signals is received, at the one or more processors, from a respective DPU circuit, in digital domain or analog domain; and
process one or more downstream data signals to be provided to the set of DPU circuits over fiber, wherein the one or more downstream data signals are associated with the one or more modem circuits coupled respectively to the one or more lines associated with the set of DPU circuits, and wherein each of the downstream data signals is provided, from the one or more processors, to a respective DPU circuit, in digital domain or analog domain;
wherein the one or more downstream data signals and the one or more upstream data signals are processed at the one or more processors, in order to perform one or more signal processing operations associated with the one or more downstream data signals and the one or more upstream data signals within the COM circuit,
wherein signal processing tasks associated with the set of DPU circuits are split among the COM circuit, a cloud management (CM) circuit, and the set of DPU circuits and the one or more signal processing operations to be performed by the one or more processors are a portion of the signal processing tasks that are assigned to the COM circuit.

2. The COM circuit of claim 1, wherein the one or more signal processing operations performed within the one or more processors, on the received one or more upstream data signals comprise one or more of analog to digital (A/D) conversion, time domain (TD) filtering, fast fourier transform (FFT), frequency domain (FD) equalization, quadrature amplitude modulation (QAM) demodulation, constellation shaping, inner forward error correction (FEC) decoding, outer FEC decoding and data encapsulation.

3. The COM circuit of claim 1, wherein the one or more signal processing operations performed within the one or more processors on the downstream data signals to be provided to the set of DPU circuits comprises one or more of data de-capsulation, inner forward error correction (FEC) encoding, outer FEC encoding, constellation shaping, quadrature amplitude modulation (QAM) modulation, frequency domain (FD) equalization, inverse fast fourier transform (IFFT), time domain (TD) filtering, digital to analog (D/A) conversion, on the downstream data signals.

4. The COM circuit of claim 1, wherein the one or more processors is further configured to perform crosstalk cancellation based on processing the one or more of the upstream data signals and the one or more of the downstream data signals, when the DPU circuits within the set of DPU circuits have crosstalk associated therewith.

5. The COM circuit of claim 4, wherein the one or more processors is configured to perform the crosstalk cancellation between the one or more upstream data signals and the one or more downstream data signals in digital domain.

6. The COM circuit of claim 4, wherein the crosstalk cancellation comprises one or more of a near end cross talk (NEXT) cancellation, far end crosstalk (FEXT) cancellation and echo cancellation.

7. The COM circuit of claim 4, wherein the one or more processors is configured to perform the crosstalk cancellation between the one or more upstream data signals and the one or more downstream data signals based on predetermined cancellation matrices.

8. The COM circuit of claim 7, wherein performing the crosstalk cancellation comprises:
generating one or more precoded downstream data signals respectively based on the one or more downstream data signals, in accordance with a predefined far end crosstalk (FEXT) cancellation relation, based on the predetermined cancellation matrices.

9. The COM circuit of claim 7, wherein performing the crosstalk cancellation comprises:
generating one or more crosstalk compensated upstream data signals respectively based on the one or more upstream data signals and the one or more downstream data signals, in accordance with a predefined near end crosstalk (NEXT) cancellation relation, based on the predetermined cancellation matrices.

10. The COM circuit of claim 7, wherein the one or more processors is further configured to update the predefined cancellation matrices.

11. The COM circuit of claim 1, wherein the one or more processors is further configured to compress the one or more downstream data signals, prior to providing the one or more downstream data signals to the set of DPU circuits over fiber.

12. A distribution point unit (DPU) circuit associated with a communication system configured to be coupled to a central office management (COM) circuit over fiber, the DPU circuit comprising:
a memory configured to store a plurality of instructions; and
one or more processors configured to retrieve the plurality of instructions from the memory, and upon execution of the plurality of instructions is configured to:
provide one or more upstream data signals in digital domain or analog domain, to the COM circuit over fiber, in order to enable the COM circuit or a cloud management (CM) circuit associated therewith to perform one or more signal processing operations comprising analog to digital (A/D) conversion, time domain (TD) filtering, fast fourier transform (FFT), frequency domain (FD) equalization, quadrature amplitude modulation (QAM) demodulation, constellation shaping, inner forward error correction (FEC) decoding, outer FEC decoding and data encapsulation, on the upstream data signals;
wherein the one or more upstream data signals are associated with one or more modem circuits respectively coupled to one or more lines associated with the DPU circuit,
wherein signal processing tasks associated with a set of DPU circuits are split between the COM circuit, the CM circuit, and the set of DPU circuits and the one or more signal processing operations to be performed by the COM circuit or the CM circuit are a portion of the signal processing tasks that are assigned to the COM circuit or the CM circuit.

13. The DPU circuit of claim 12, wherein the one or more processors is further configured to perform one or more signal processing operations comprising optical modulation, analog to digital conversion, time domain (TD) filtering, fast fourier transform (FFT) and frequency domain (FD) equalization, on the one or more upstream data signals, prior to providing the one or more upstream data signals to the COM circuit.

14. The DPU circuit of claim 12, wherein the one or more processors is further configured to receive one or more downstream data signals from the COM circuit over fiber, in digital domain or analog domain, wherein the one or more downstream data signals are to be provided to the one or more modem circuits respectively coupled to the one or more lines associated with the DPU circuit.

15. The DPU circuit of claim 14, wherein the one or more processors is further configured to perform one or more of the signal processing operations comprising optical demodulation, frequency domain (FD) equalization, inverse fast Fourier transform (IFFT), time domain (TD) filtering and digital to analog (D/A) conversion, on the one or more downstream data signals, prior to providing the one or more downstream data signals to the respective modem circuits.

16. The DPU circuit of claim 12, wherein the one or more upstream data signals provided to the COM circuit comprise digital time domain (TD) signals.

17. The DPU circuit of claim 12, wherein the one or more upstream data signals provided to the COM circuit comprise digital frequency domain (FD) signals.

18. The DPU circuit of claim 14, wherein the one or more processors is further configured to perform crosstalk cancellation, based on processing the one or more upstream data signals and the one or more downstream data signals.

19. The DPU circuit of claim 18, wherein the one or more processors is configured to perform the crosstalk cancellation based on processing the one or more upstream data signals and the one or more downstream data signals, in digital domain.

20. The DPU circuit of claim 18, wherein the crosstalk cancellation comprises one or more of a near end cross talk (NEXT) cancellation, far end crosstalk (FEXT) cancellation and echo cancellation.

21. The DPU circuit of claim 12, wherein the one or more processors is further configured to compress the one or more upstream data signals, prior to providing the one or more upstream data signals to the COM circuit over fiber.

22. The DPU circuit of claim 14, wherein the one or more processors is further configured to establish a timing reference, to enable to adjust a timing associated with both the upstream data signals and the downstream data signals associated with the DPU circuit, in order to enable an efficient cross talk cancellation.

23. A cloud management (CM) circuit associated with a communication system configured to couple to a COM circuit over fiber, the CM circuit comprising:
a memory configured to store a plurality of instructions; and
one or more processors configured to retrieve the plurality of instructions from the memory, and upon execution of the plurality of instructions is configured to:
receive one or more upstream data signals from the COM circuit in analog domain or in digital domain, wherein the one or more upstream data signals are associated with one or more modem circuits coupled respectively to one or more lines associated with a set of DPU circuits coupled to the COM circuit; and
perform one or more of the signal processing operations comprising analog to digital (A/D) conversion, TD filtering, fast Fourier transform (FFT), frequency domain (FD) equalization, quadrature amplitude modulation (QAM) demodulation, constellation shaping, inner forward error correction (FEC) decoding, outer FEC decoding and data encapsulation, on the received one or more upstream data signals,
wherein signal processing tasks associated with the set of DPU circuits are split among the COM circuit, the CM circuit, and the set of DPU circuits and the one or more signal processing operations to be performed by the one or more processors are a portion of the signal processing tasks that are assigned to the CM circuit.

24. The CM circuit of claim 23, wherein the one or more processors is further configured to provide one or more downstream data signals to the COM circuit in digital domain or analog domain, wherein the one or more downstream data signals are associated with one or more modem circuits coupled respectively to one or more lines associated with the set of DPU circuits coupled to the COM circuit.

25. The CM circuit of claim 24, wherein the one or more processors is further configured to perform one or more of the signal processing operations comprising data de-capsulation, inner forward error correction (FEC) encoding, outer FEC encoding, constellation shaping, quadrature amplitude modulation (QAM) modulation, frequency domain (FD) equalization, inverse fast fourier transform (IFFT), time domain (TD) filtering and digital to analog (D/A) conversion, on the one or more downstream data signals, prior to providing the one or more downstream data signals to the COM circuit.

26. The CM circuit of claim 25, wherein the one or more processors is further configured to perform crosstalk cancellation based on processing the one or more upstream data signals and the one or more downstream data signals, when the DPU circuits associated with the set of DPU circuits have crosstalk associated therewith.

27. The CM circuit of claim 26, wherein the one or more processors is configured to perform the cross talk cancellation in digital domain.

28. The CM circuit of claim 26, wherein the crosstalk cancellation comprises one or more of a near end cross talk (NEXT) cancellation, far end crosstalk (FEXT) cancellation and echo cancellation.

29. The CM circuit of claim 25, wherein the one or more processors is further configured to perform a cancellation matrix update comprising updating one or more cancellation matrices to be utilized in crosstalk cancellation based on processing the one or more upstream data signals and the one or more downstream data signals.

* * * * *